United States Patent
Arefi

(10) Patent No.: US 12,320,339 B2
(45) Date of Patent: Jun. 3, 2025

(54) SYSTEMS AND PROCESSES FOR GENERATING ELECTRICITY FROM A GEOTHERMAL ENERGY SOURCE VIA AN INTEGRATED THERMAL POWER PLANT

(71) Applicant: Babak Bob Arefi, Spring, TX (US)

(72) Inventor: Babak Bob Arefi, Spring, TX (US)

(*) Notice: Subject to any disclaimer, the term of this patent is extended or adjusted under 35 U.S.C. 154(b) by 0 days.

(21) Appl. No.: 18/294,910

(22) PCT Filed: Aug. 5, 2022

(86) PCT No.: PCT/US2022/039592
§ 371 (c)(1),
(2) Date: Feb. 2, 2024

(87) PCT Pub. No.: WO2023/014981
PCT Pub. Date: Feb. 9, 2023

(65) Prior Publication Data
US 2024/0337254 A1    Oct. 10, 2024

Related U.S. Application Data

(60) Provisional application No. 63/229,810, filed on Aug. 5, 2021.

(51) Int. Cl.
*F03G 4/00*    (2006.01)
*F24T 10/00*    (2018.01)
(Continued)

(52) U.S. Cl.
CPC ............. *F03G 4/029* (2021.08); *F03G 4/033* (2021.08); *F24T 10/13* (2018.05); *F24T 50/00* (2018.05); *F24T 2010/50* (2018.05)

(58) Field of Classification Search
CPC .......... F03G 4/029; F03G 4/033; F24T 10/13; F24T 50/00; F24T 2010/50
See application file for complete search history.

(56) References Cited

U.S. PATENT DOCUMENTS 3,908,381 A    9/1975    Barber et al.
6,668,554 B1    12/2003    Brown
(Continued)

OTHER PUBLICATIONS

International Preliminary Report of Patentability (Chapter II of PCT App No. PCT/US2022/039592) Oct. 18, 2023.

*Primary Examiner* — Hoang M Nguyen
(74) *Attorney, Agent, or Firm* — McCutcheon Joseph, PLLC

(57) ABSTRACT

Geothermal energy systems and processes eliminate or reduce the distance between a geothermal energy source and an electricity generating power plant The systems and processes include heating a primary fluid by absorbing thermal energy from the geothermal energy source in a well to produce a heated primary fluid; conveying the heated primary fluid to the power plant including, a turbine and an electricity generator; driving the turbine by one of: the heated primary fluid; and a secondary fluid that absorbs thermal energy from the heated primary fluid via, a heat exchanger; and driving the electricity generator via, the turbine to generate electricity. The power plant is positioned at one of: inside the well; partially inside the well; at a wellhead above the well; adjacent to the well; on a pad including one or more wells; and between multiple pads including one or more wells in the same field of pads.

20 Claims, 33 Drawing Sheets

(51) Int. Cl.
*F24T 10/13* (2018.01)
*F24T 50/00* (2018.01)

(56) References Cited

U.S. PATENT DOCUMENTS

| | | | |
|---|---|---|---|
| 2012/0174581 A1* | 7/2012 | Vaughan | F24T 10/10 |
| | | | 290/40 C |
| 2013/0227947 A1* | 9/2013 | Bronicki | F01K 25/08 |
| | | | 60/671 |
| 2013/0333383 A1* | 12/2013 | Schwarck | F24T 10/10 |
| | | | 165/45 |
| 2018/0224164 A1 | 8/2018 | Lakic | |
| 2020/0347707 A1 | 11/2020 | Bowdon et al. | |
| 2023/0077091 A1* | 3/2023 | Arefi | F24T 10/30 |
| 2024/0183342 A1* | 6/2024 | Taylor | F24T 50/00 |

* cited by examiner

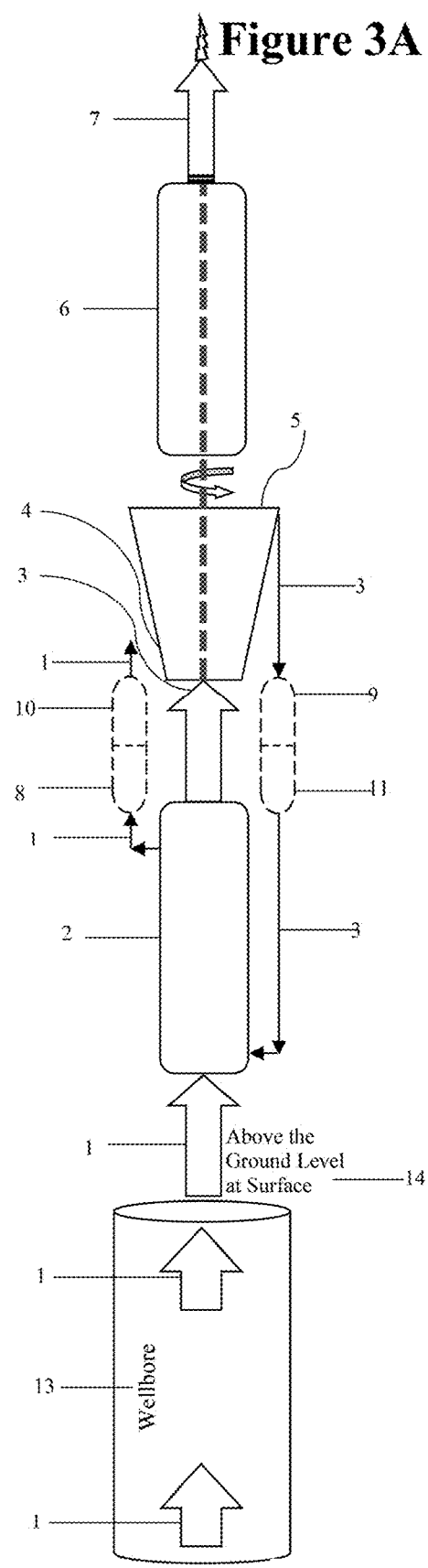

PAD (consists of several wells | from 1+ to N wells)

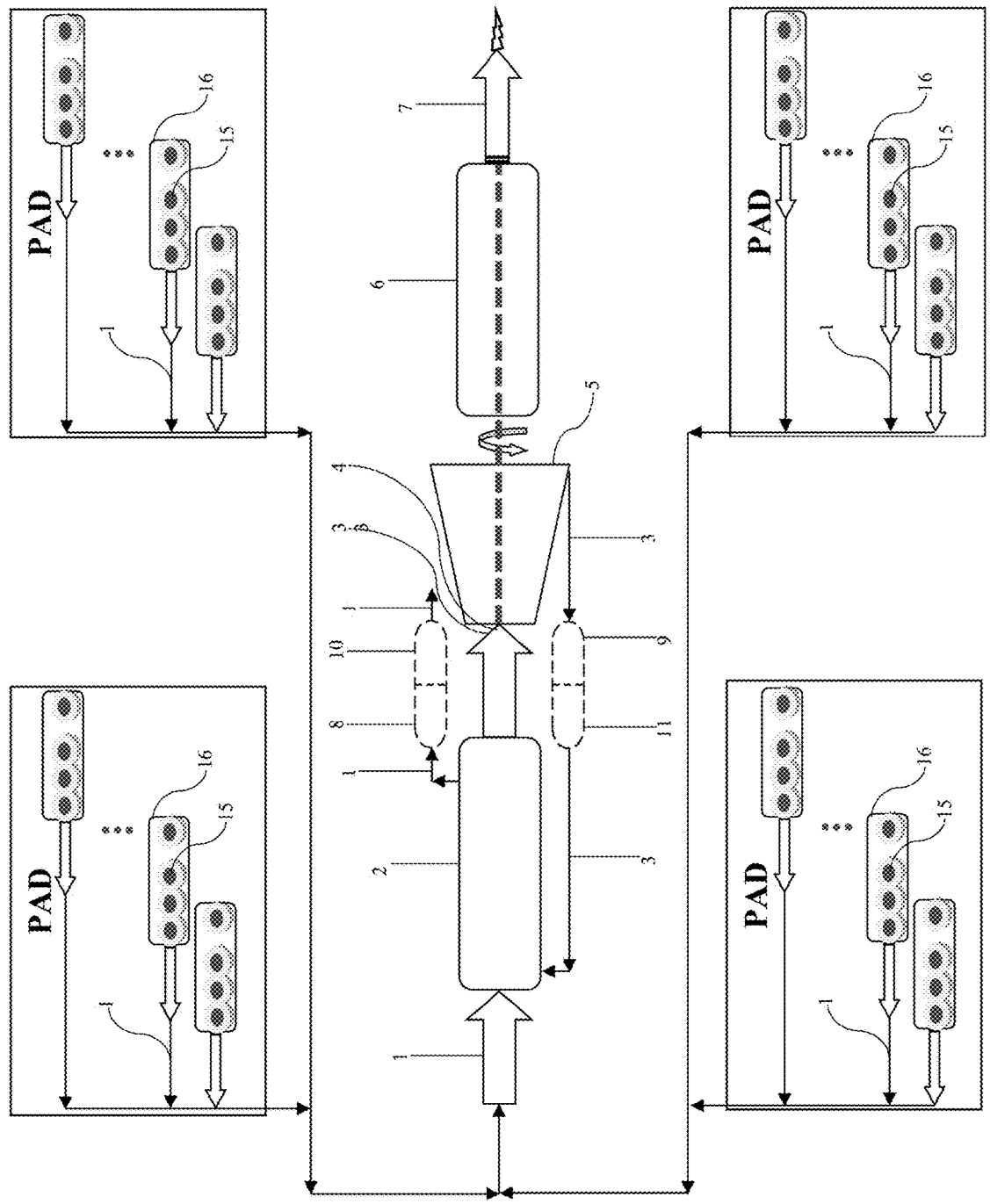
Figure 5A1

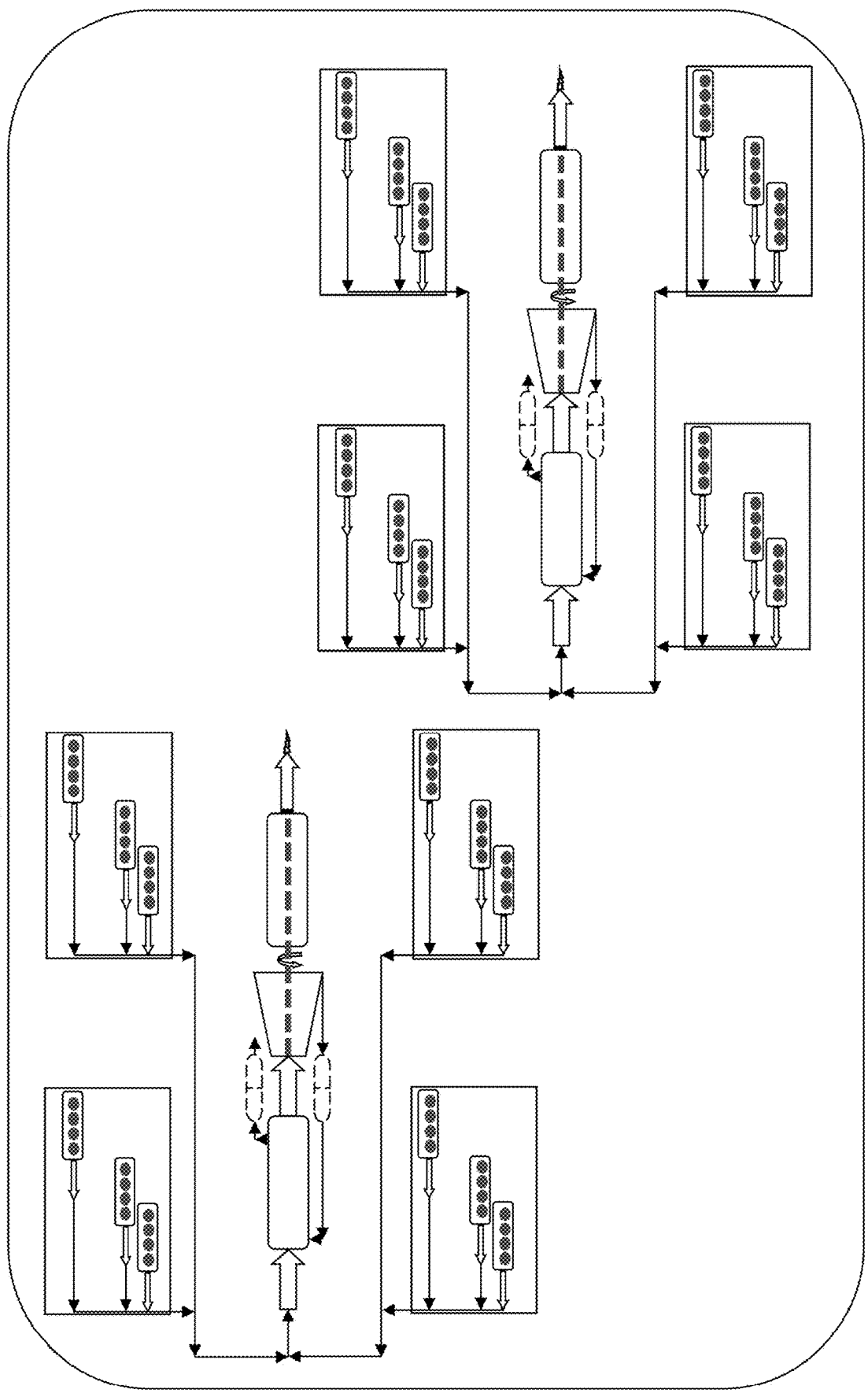
Figure 5A2 (Field)

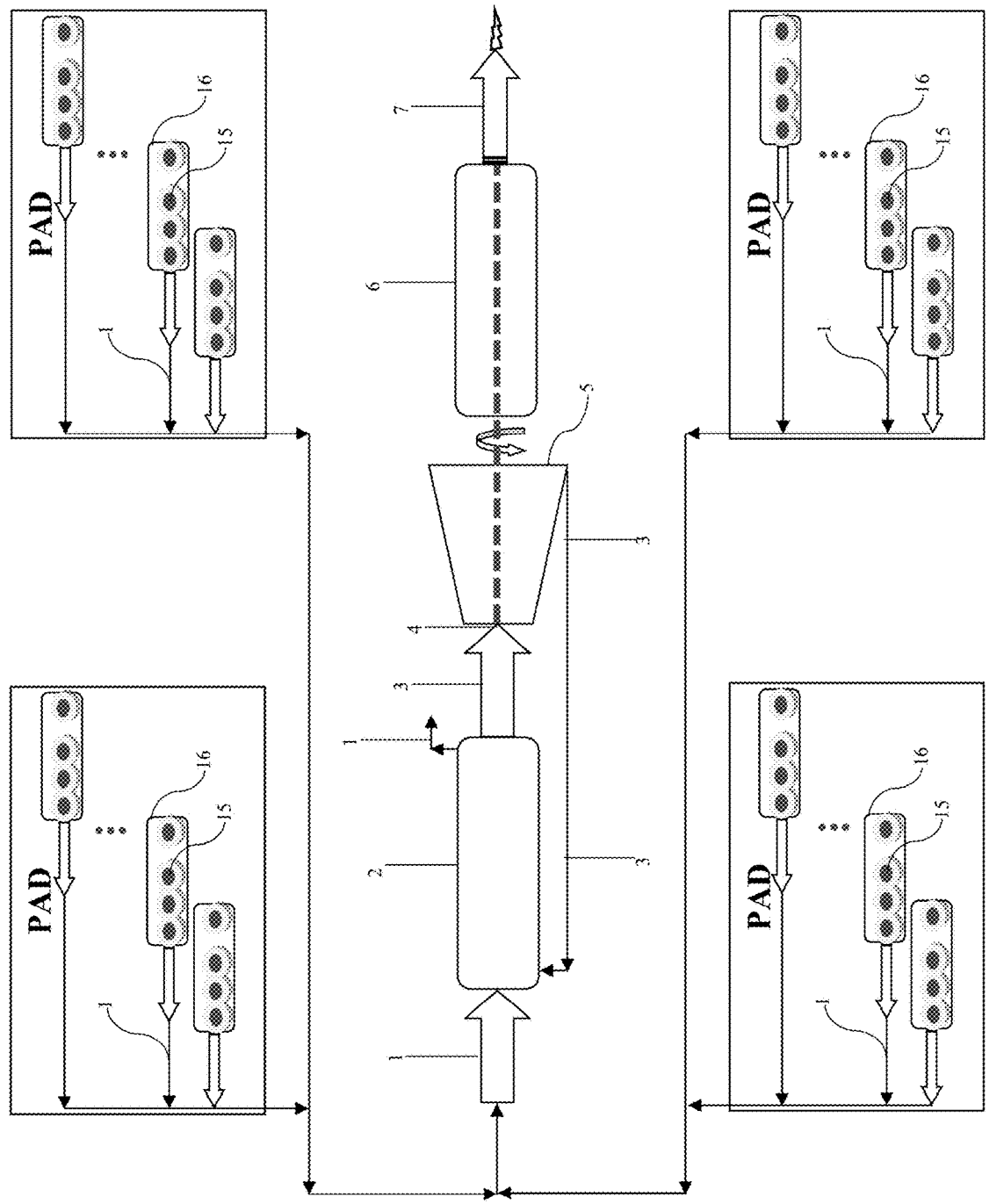
Figure 5B1

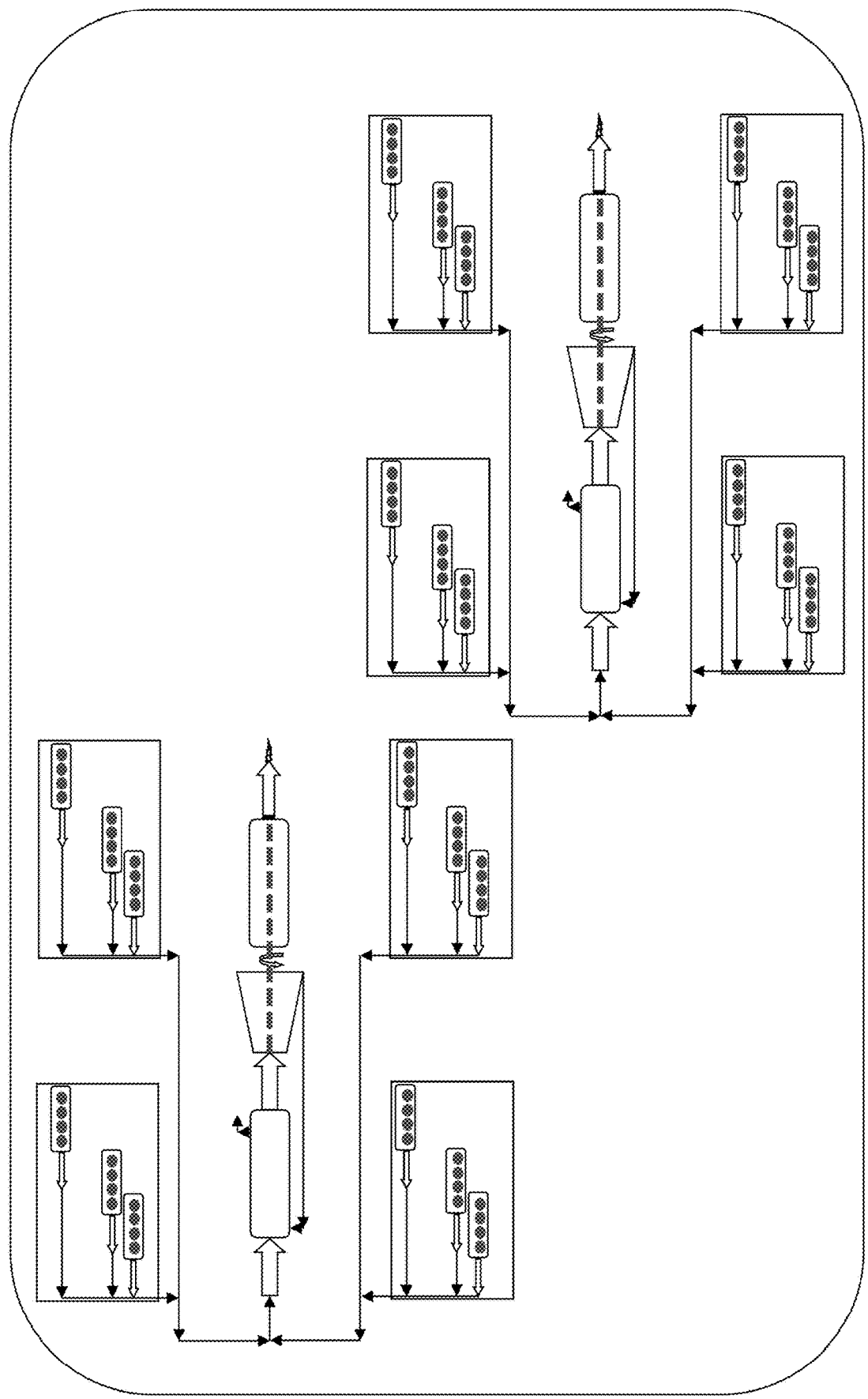
Figure 5B2 (Field)

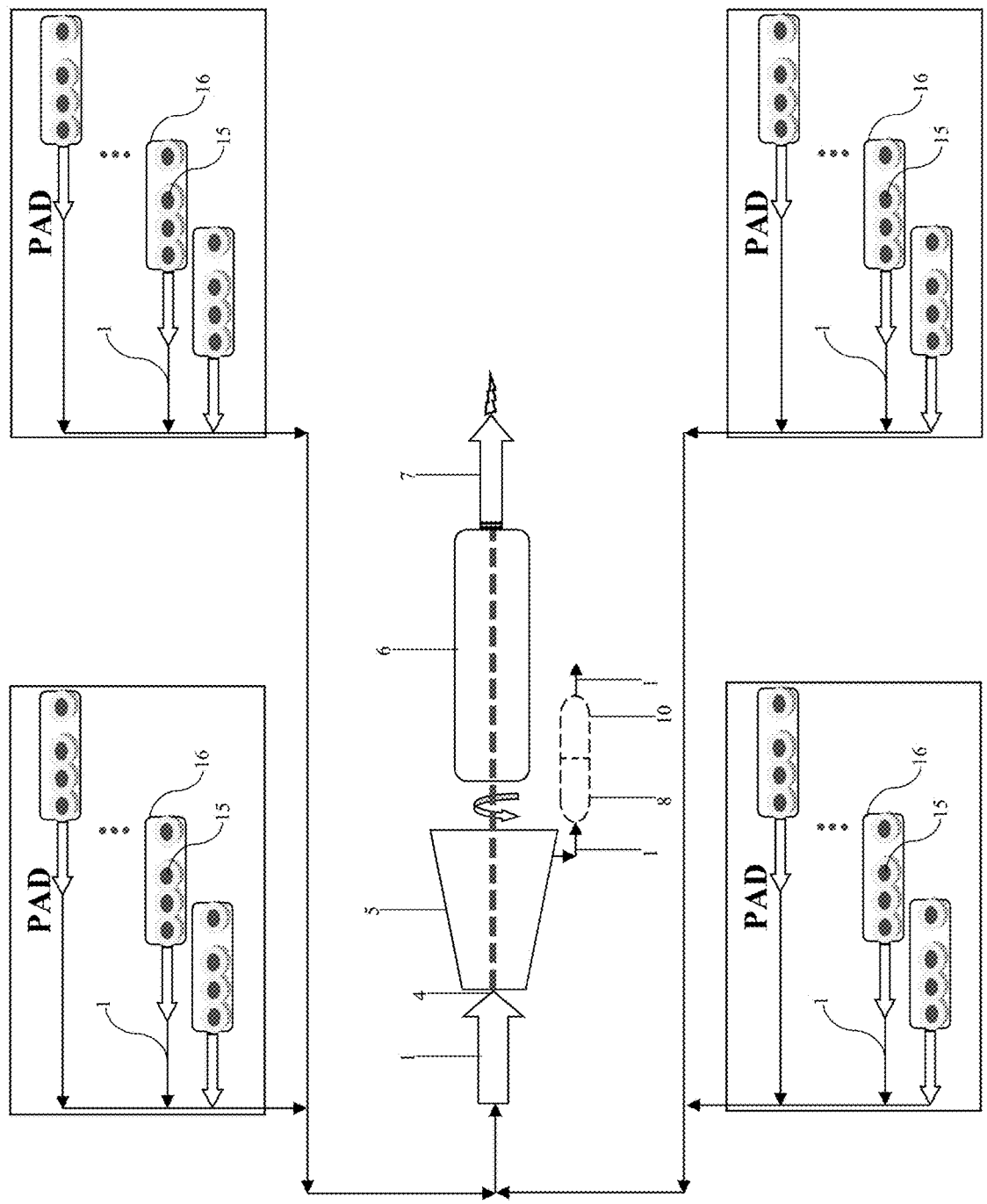
Figure 5C1

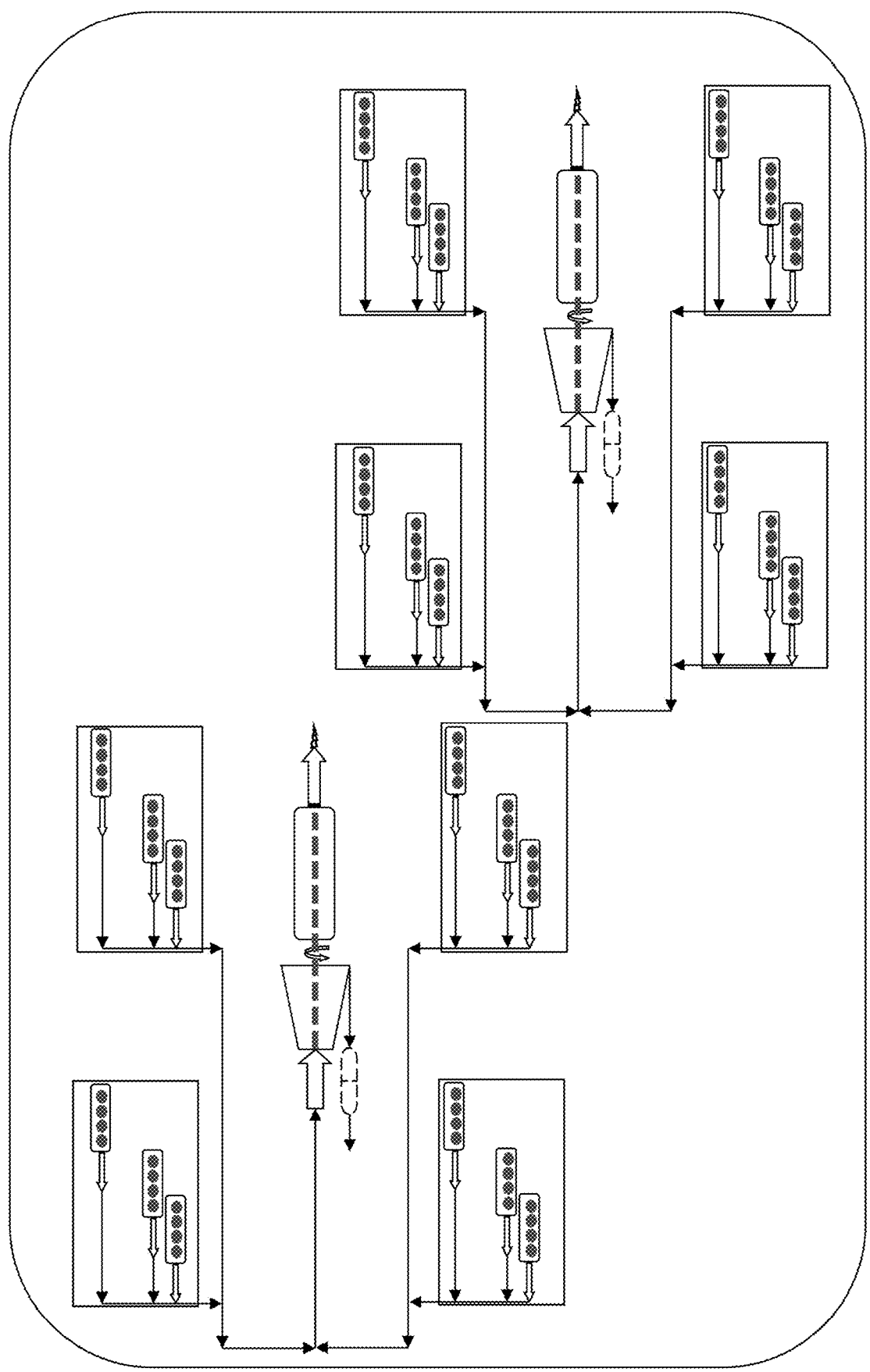
Figure 5C2 (Field)

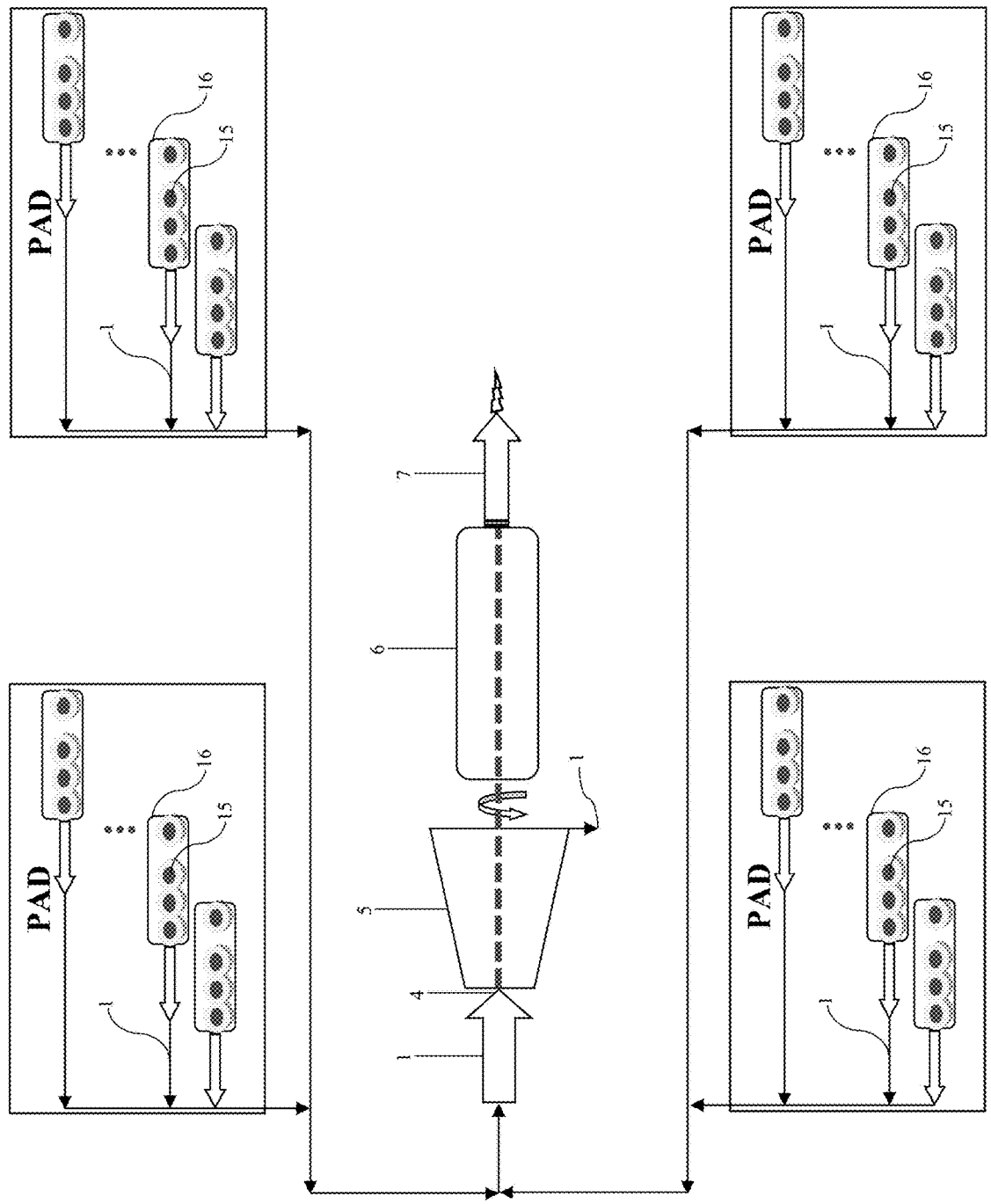
Figure 5D1

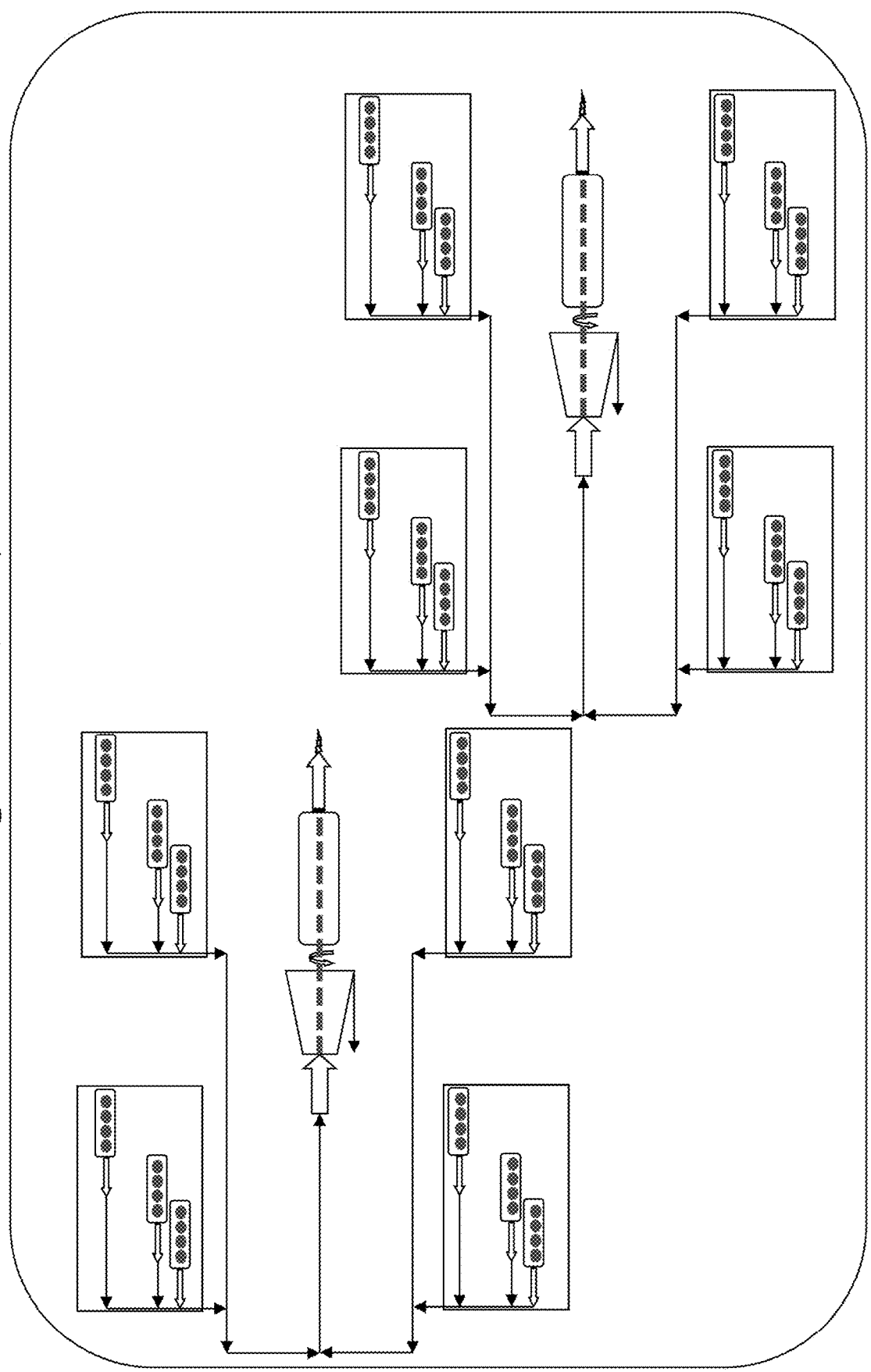
Figure 5D2 (Field)

SYSTEMS AND PROCESSES FOR GENERATING ELECTRICITY FROM A GEOTHERMAL ENERGY SOURCE VIA AN INTEGRATED THERMAL POWER PLANT

CROSS REFERENCE TO RELATED APPLICATIONS

This application is a national stage application claiming priority to and the benefit of International Patent Application No. PCT/US2022/039592, titled "Systems and Processes for Generating Electricity from a Geothermal Energy Source Via an Integrated Thermal Power Plant," filed on Aug. 5, 2022, that claims priority to and the benefit of a U.S. Provisional Application No. 63/229,810, filed on Aug. 5, 2021. The disclosures of the prior applications are hereby incorporated by reference herein in their entirety.

TECHNICAL FIELD

The present disclosure relates to green energy generation processes and systems, such as geothermal and kinetic energy processes and systems, which generate electricity. In particular, the present disclosure relates to geothermal energy processes and systems that integrate an electricity generating power plant with a geothermal energy source to decrease a distance between the power plant and the thermal energy source.

BACKGROUND

Known green energy systems include geothermal energy systems that utilize a naturally occurring energy source to generate electricity. Geothermal energy systems extract heat from an underground geologic formation, such as a hot rock reservoir. In a typical geothermal energy system, a fluid is pumped down into an underground rock formation to transfer thermal energy of the rock formation to the surface. At the surface, the heated fluid is utilized in a process that drives a turbine and an electrical generator to produce electrical power, and then the fluid may be pumped back into the underground formation to repeat the cycle.

SUMMARY

In known green energy systems, the components for generating electricity (e.g., the turbine and the electricity generator) are disposed at a location that is separate and distinct from the thermal energy source. The distance between the thermal energy source and the power plant can be large, sometimes spanning several miles. The thermal energy, usually contained in fluid, from the thermal energy source is generally conveyed or otherwise transported to the electricity generating components via conduits, such as metal pipes or tubulars. There can be a significant amount of thermal energy loss in the path of fluid during the transportation of the fluid from the thermal energy source to electricity generating components. This is because the thermal energy in the fluid is conducted and/or radiated to the conduits or the surrounding environment during transportation. The longer the distance the fluid must travel from the thermal energy source, the more thermal energy is lost. The loss of thermal energy reduces the kinetic energy of the fluid, and hence the potency in which the fluid can drive the turbine. Driving the turbine with less energy decrease the amount of electromagnetic induction in the electricity generator, and as a result the amount of electricity produced by the electricity generator decreases. Thus, the long distance between the thermal energy source and the components for generating electricity reduces the efficiency of the green energy systems.

The present disclosure describes different types of geothermal energy processes and systems that eliminate or greatly reduce the distance between the thermal energy source and the components of a power plant for generating electricity by integrating the power plant with the thermal energy source. The present disclosure thus provides systems and processes for generating electricity from a geothermal energy source that are improvements over known systems and processes for generating green energy.

In one embodiment, a process of generating electricity from a geothermal energy source comprises: heating a primary fluid by absorbing thermal energy from the geothermal energy source in a well to produce a heated primary fluid; conveying the heated primary fluid to a thermal power plant that comprises a turbine and an electricity generator; driving the turbine by one of: the heated primary fluid; and a secondary fluid that absorbs thermal energy from the heated primary fluid via a heat exchanger; and driving the electricity generator via the turbine to generate electricity, wherein the thermal power plant is positioned at one of: inside the well; partially inside the well; at a wellhead above the well; adjacent to the well; on a pad including one or more wells; and between multiple pads including one or more wells in a same field of pads.

In an embodiment, the process further comprises extracting heat from one of the heated primary fluid and the secondary fluid that exits the turbine in a condenser to reduce a temperature of the one of the heated primary fluid and the secondary fluid.

In an embodiment, the process further comprises increasing a pressure of the one of the heated primary fluid and the secondary fluid via one of: (i) a compressor when the one of the heated primary fluid and the secondary fluid is in a gaseous phase; and (ii) a pump when the one of the heated primary fluid and the secondary fluid is in a liquid phase.

In an embodiment, the one of the heated primary fluid and the secondary fluid changes to a supercritical state or a gaseous state when absorbing thermal energy, and the thermal power plant is positioned at a predetermined distance from the geothermal energy source to maintain the supercritical state or the gaseous state so that the one of the heated primary fluid and the secondary fluid enters the turbine in the supercritical state or the gaseous state.

In another embodiment, a geothermal system for generating electricity comprises: a well that comprises a geothermal energy source; a primary fluid that absorbs thermal energy from the geothermal energy source to produce a heated primary fluid; and a thermal power plant comprising a turbine and an electricity generator, wherein the turbine is driven by one of: the heated primary fluid; and a secondary fluid that absorbs thermal energy from the heated primary fluid via a heat exchanger, the electricity generator is driven by the turbine to generate electricity, and the thermal power plant is positioned at one of: inside the well; partially inside the well; at a wellhead above the well; adjacent to the well; on a pad including one or more wells; and between multiple pads including one or more wells in a same field of pads.

In an embodiment, the system further comprises a condenser that extracts heat from one of the heated primary fluid and the secondary fluid that exits the turbine to reduce a temperature of the one of the heated primary working fluid and the secondary fluid.

In an embodiment, the system further comprises one of: (i) a compressor to increase a pressure of the one of the heated primary fluid and the secondary fluid when the one of the heated primary fluid and the secondary fluid is in a gaseous phase; and (ii) a pump to increase a pressure of the one of the heated primary fluid and the secondary fluid when the one of the heated primary fluid and the secondary fluid is in a liquid phase.

In an embodiment, wherein the one of the heated primary fluid and the secondary fluid changes to a supercritical state or a gaseous state when absorbing thermal energy, and the thermal power plant is positioned at a predetermined distance from the geothermal energy source to maintain the supercritical state or the gaseous state so that the one of the heated primary fluid and the secondary fluid enters the turbine in the supercritical state or the gaseous state.

In a further embodiment, a geothermal system for generating electricity comprises: a pad; a plurality of wells on the pad, wherein each of the wells comprises a geothermal energy source, and wherein each of the wells includes a primary fluid that absorbs thermal energy from the geothermal energy source to produce a heated primary fluid; and a thermal power plant that is located on the pad or between multiple pads including one or more wells in a same field of pads, wherein the thermal power plant receives the heated primary fluid from each of the wells on the pad or the multiple pads.

In an embodiment, the thermal power plant comprises: a turbine that is driven by one of: the heated primary fluid; and a secondary fluid that absorbs thermal energy from the heated primary fluid via a heat exchanger; and an electricity generator that is driven by the turbine to generate electricity.

In an embodiment, the thermal power plant further comprises a condenser that extracts heat from one of the heated primary fluid and the secondary fluid that exits the turbine to reduce a temperature of the one of the heated primary working fluid and the secondary fluid.

In an embodiment, the thermal power plant further comprises one of: (i) a compressor to increase a pressure of the one of the heated primary fluid and the secondary fluid when the one of the heated primary fluid and the secondary fluid is in a gaseous phase; and (ii) a pump to increase a pressure of the one of the heated primary fluid and the secondary fluid when the one of the heated primary fluid and the secondary fluid is in a liquid phase.

In an embodiment, the one of the heated primary fluid and the secondary fluid changes to a supercritical state or a gaseous state when absorbing thermal energy, and the thermal power plant is positioned at a predetermined distance from the geothermal energy source to maintain the supercritical state or the gaseous state so that the one of the heated primary fluid and the secondary fluid enters the turbine in the supercritical state or the gaseous state.

BRIEF DESCRIPTION OF THE FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein.

FIG. 3A is a schematic illustration of a geothermal system for generating electricity in which the geothermal power plant is positioned at a wellhead, according to an embodiment.

FIG. 5A1 is a schematic layout of a geothermal system for generating electricity in which the geothermal power plant is located in a field of wells between pads, according to an embodiment.

FIG. 5A2 illustrates a schematic layout of a field of wells that includes multiple geothermal power plants provided between different groups of pads of FIG. 5A1, according to an embodiment.

FIG. 5B1 is a schematic layout of another geothermal system for generating electricity in which the geothermal power plant is located in a field of wells between pads, according to another embodiment.

FIG. 5B2 illustrates a schematic layout of a field of wells that includes multiple geothermal power plants provided between different groups of pads of FIG. 5B1, according to an embodiment.

FIG. 5C1 is a schematic layout of a further geothermal system for generating electricity in which the geothermal power plant is located in a field of wells between pads, according to a further embodiment.

FIG. 5C2 illustrates a schematic layout of a field of wells that includes multiple geothermal power plants provided between different groups of pads of FIG. 5C1, according to an embodiment.

FIG. 5D1 is a schematic layout of yet another geothermal system for generating electricity in which the geothermal power plant is located in a field of wells between pads, according to yet a another embodiment.

FIG. 5D2 illustrates a schematic layout of a field of wells that includes multiple geothermal power plants provided between different groups of pads of FIG. 5D1, according to an embodiment.

DETAILED DESCRIPTION

Figure 1A:
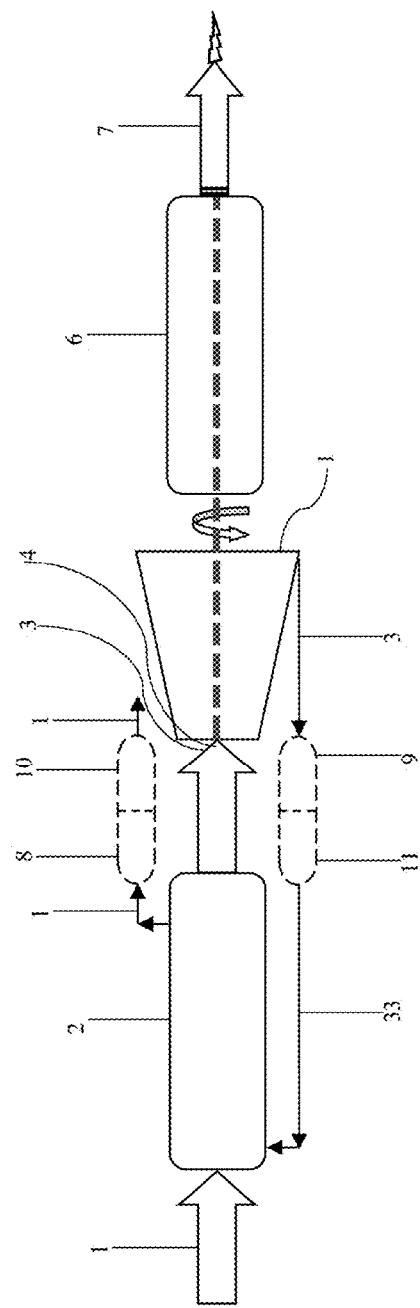
FIG. 1A is a schematic illustration of a geothermal power plant according to a first embodiment.

While processes, systems and devices are described herein by way of examples and embodiments, those skilled in the art recognize the processes, systems and devices are not limited to the embodiments or drawings described. It should be understood that the drawings and description are not intended to be limited to the particular form disclosed. Rather, the intention is to cover all modifications, equivalents and alternatives falling within the spirit and scope of the appended claims and description. Any headings used herein are for organization purposes only and are not meant to limit the scope of the description of the claims. As used herein, the word "may" is used in a permissive sense (i.e., meaning having the potential to) rather than the mandatory sense (i.e., meaning must). Similarly, the words "include," "including," and "includes" mean including, but not limited to. The present disclosure describes particular embodiments and with reference to certain drawings, but the subject matter is not limited thereto.

The present disclosure will provide description to the accompanying drawings, in which some, but not all embodiments of the subject matter of the disclosure are shown. Indeed, the subject matter may be embodied in many different forms and should not be construed as limited to the embodiments set forth herein, rather, these embodiments are provided so that this disclosure satisfies all the legal requirements. The disclosure herein is illustrative and explanatory of one or more embodiments and variations thereof, and it will be appreciated that various changes in the design, organization, means of operation, structures and location, methodology, and use of mechanical equivalents may be made without departing from the spirit of the invention. Because many varying and different embodiments may be made within the scope of the concept(s) herein taught, and because many modifications may be made in the embodiments described herein, it is to be understood that the details herein are to be interpreted as illustrative and non-limiting.

Certain terminology is used in the following description for convenience only and is not limiting. Certain words used herein designate directions in the drawings to which reference is made. Unless specifically set forth herein, the terms "a," "an" and "the" are not limited to one element, but instead should be read consistent with the meaning of "one or more," "at least one," and "one or more than one." As used herein "another" means at least a second or more. The terminology includes the words noted above, derivatives thereof and words of similar import.

Use of the term "about", when used with a numerical value, is intended to include+/−10%. For example, if a number of amino acids is identified as about 200, this would include 180 to 220 (plus or minus 10%). Similarly, use of the term "approximately", when used with a numerical value, is intended to include+/−10%. For example, if a number of amino acids is identified as approximately 200, this would include 180 to 220 (plus or minus 10%).

Unless otherwise defined, all technical and scientific terms used herein have the same meaning as commonly understood by one of ordinary skill in the art.

FIG. 1A illustrates one embodiment of a geothermal power plant that can be used with a geothermal energy source in a well to generate electricity. The geothermal power plant may include a heat exchanger 2 that receives a primary fluid 1 from a geothermal well (not shown in FIG. 1A). In the geothermal well, at least some portion of thermal energy from the geothermal energy source is transferred as heat to the primary fluid 1 by heat exchange. The geothermal energy source may include, but is not limited to hot rock formations and reservoirs in underground geologic formations. The primary fluid 1 absorbs the thermal energy from the geothermal energy source. That is, the geothermal energy source transfers thermal energy (i.e., heat) to raise the thermal energy and/or temperature of the primary fluid 1. The transferred heat from the geothermal energy source can elevate the kinetic energy of the primary fluid 1 so that the heated primary fluid 1 may have a relatively high temperature and pressure. The thermal energy may be derived from the motion and vibration of molecules of the geothermal energy source.

The heat exchanger 2 transfers the thermal energy of the primary fluid 1 to a secondary fluid 3. In the present disclosure, a heat exchanger 2 can be any mechanical device that transfers thermal energy from one substance (e.g., a higher thermal energy fluid) to another substance (e.g., a lower thermal energy fluid) via "conduction", "convection" and/or "radiation". As a non-limiting example, a shell and tube heat exchanger may be implemented with the geothermal power plants discussed herein. FIG. 1A thus illustrates a "binary system" involving two fluids: (i) a primary fluid 1 that is heated by absorbing thermal energy from the geothermal energy source in a well to produce a heated primary fluid 1; and secondary fluid 3 that absorbs the thermal energy (heat) from the primary fluid 1 in the heat exchanger 2. Upon absorbing the thermal energy (heat) in the heat exchanger 2, the secondary fluid 3 may increase its temperature, volume and pressure, and thus its enthalpy, and may change its phase/state from a liquid to a gas/vapor. The secondary fluid 3 may also be heated to the extent that the secondary fluid 3 reaches a supercritical state. The structure of the heat exchanger 2 is not limited in the present disclosure to any particular design or configuration, so long as the heat exchanger 2 is operable to transfer heat from the thermal energy source to a working fluid (e.g., from a heated primary fluid 1 to a secondary fluid 3). As examples, the heat exchanger 2 may be a finned tube heat exchanger, a shell and tube heat exchanger, or a plate heat exchanger. Other types of heat exchangers not listed here that may be used to transfer heat to the secondary fluid 3 are within the scope of this invention. The heated secondary fluid 3 is then directed from the heat exchanger 2 towards a turbine 5. In some instances, the heated secondary fluid 3 may be considered as a kinetic energy fluid by virtue of its molecular movement to drive the turbine 5. The primary fluid 1 may also be considered as a kinetic energy fluid by virtue of its molecular movement.

The heated secondary fluid 3 (e.g., having a high pressure and high temperature) flows from the heat exchanger 2 into the turbine 5. In one embodiment, the turbine 5 may include a series of blades mounted on a shaft. As the heated secondary fluid 3, preferably in the supercritical gas state/phase, enters the turbine 5, its kinetic energy will exert a force to move the series of blades on the shaft. The force turns the blades, which rotates the shaft to drive the turbine 5. In the present disclosure, a turbine 5 is any mechanical device that performs work by using the kinetic energy of a fluid (e.g., a primary fluid, a secondary fluid, or a working fluid). That is, a turbine may be a device or equipment that transfers kinetic energy to mechanical energy to perform work. The turbine 5, in turn, drives an electricity generator 6 to generate electricity 7 via electromagnetic induction. In the present disclosure, the electricity generator 6 is any mechanical/electrical device that changes kinetic energy to electrical energy. In one embodiment, the electricity generator 6 includes a rotor that is connected to the shaft of the turbine 5 so as to rotate with rotation of the shaft. The rotor of the electricity generator 6 may include a coil of copper wire (armature) that rotates in response to rotation of the shaft of the turbine 5. Two polar field magnets on either side of the armature create a magnetic field inside the in the electricity generator 6. As the rotor, shaft, and armature rotate, they move within the electric field created by the magnets. As the turbine 5 rotates the armature through the magnetic field, an electrical current is created within the copper coil of the armature. This process of generating electrical current is known as electromagnetic induction. The electricity 7 produced can be extracted from the electricity generator 6, and may be sent to an electrical grid for commercial distribution and use. In this regard, the frequency of the electricity 7 from the electricity generator 6 can be adjusted to the grid-line frequency of the grid to synchronize the transmission. The faster the electricity generator 6 is driven, the more electricity 7 it can produce.

Two main factors for having a significant amount of kinetic energy entering the turbine 5 can be a supercritical state of the fluid and the flow rate of the fluid. A fluid in the supercritical state will have higher kinetic energy, and thus and create more work. A higher flowrate of the fluid will also create more work due to its higher magnitude of impact on the blades of the turbine 5. More work has the potential to subsequently generate more electricity. In this regard, the geothermal power plant may optionally include a nozzle 4 provided between the heat exchanger 2 and the turbine 5, so that the high pressure and temperature secondary fluid 3 passes through the nozzle 4 before entering the turbine 5. The nozzle 4 provides a restriction in the path of the heated secondary fluid 3 in order to transfer some of the pressure of the heated primary fluid 3 to velocity, and thus expand the volume of the heated primary fluid 3. The nozzle 4 may be a fixed restriction in the path of the heated primary fluid 3, or may be an adjustable expansion valve that can be controlled, e.g., electronically or manually, to adjust the size of the restriction based on system conditions, a desired temperature and/or pressure of the heated primary fluid 3, or other considerations.

The pressure of the heated secondary fluid 3 after driving the turbine 5 is reduced, such that the heated secondary fluid 3 exiting the turbine 5 is in a low pressure, high temperature state. In this state, the heated secondary fluid 3 may be conveyed to a condenser 9 to reduce the temperature of the heated secondary fluid 3. In the present disclosure, a condenser is any mechanical device that lowers temperature of a fluid. In some embodiments, the condenser 9 may not be required, and may be omitted. Reducing the temperature of the heated secondary fluid 3 is beneficial because a lower (cooler) temperature allows the secondary fluid 3 to subsequently absorb more heat from the thermal energy of the primary fluid 1 in the heat exchanger 2 and thus increases the efficiency in reusing the secondary fluid 3 in a cyclic thermodynamic process. In an embodiment, the condenser 9 exchanges or extracts the heat of the high temperature secondary fluid 3 (which may be in a superheated gas/vapor phase) with the ambient temperature of the air in the condenser 9 which causes the secondary fluid 3 to cool. Thus, the secondary fluid 3 exiting the condenser 9 may have a decreased temperature along with the decreased pressure.

The secondary fluid 3 having a decreased temperature and pressure may be conveyed back into the geothermal system to be reheated by the primary fluid 1 in the heat exchanger 2 and used again in the energy generating process. In order to maximize heat absorption from the primary fluid 1 in the heat exchanger 2, the secondary fluid 3 conveyed from the condenser 9 may pass through a compressor 11 to increase the pressure of the secondary fluid 3. In the present disclosure, a compressor is any mechanical device that elevates pressure of a fluid. In some embodiments, the compressor 11 may not be required, and may be omitted. The compressor 11 may be a pump when the secondary fluid 3 is in a liquid phase. The increase in pressure may change the secondary fluid 3 leaving the compressor 11 to a liquid state with high pressure and low temperature. This high pressure, low temperature secondary fluid 3 may then be conveyed back to the heat exchanger 2 to reabsorb heat provided by the thermal energy from the primary fluid 1 (which is heated by the geothermal energy source). The process of generating electricity 7 from the geothermal energy source described above may then be repeated in a repetitive, cyclic manner to continually generate electricity 7 (e.g., green energy).

In some embodiments, the primary fluid 1 after exchanging thermal energy with the secondary fluid 3 in the heat exchanger 2 may be conveyed back into the geothermal well to again absorb thermal energy from the geothermal energy in the manner discussed above, and may then be recirculated through the heat exchanger 2 to exchange the thermal energy with the secondary fluid 3 in a subsequent thermodynamic cycle. The pressure of the heated primary fluid 1 exiting the heat exchanger 2 after exchanging thermal energy with the secondary fluid 3 may be reduced, such that the heated primary fluid 1 may be in a low pressure, high temperature state. In this state, the heated primary fluid 1 may optionally be conveyed to a condenser 8 to reduce the temperature of the heated primary fluid 1 (in some embodiments, the condenser 8 may not be required, and may be omitted). Reducing the temperature of the heated primary fluid 1 can be beneficial because a lower (cooler) temperature allows the primary fluid 1 to subsequently absorb more heat from the thermal energy source in the geothermal well. Absorbing more heat from the thermal energy source increases the efficiency in reusing the primary fluid 1 in a cyclic thermodynamic process. In an embodiment, the condenser 8 exchanges or extracts the heat of the high temperature primary fluid 1 with the ambient temperature of the air in the condenser 8, which causes the primary fluid 1 to cool. Thus, the primary fluid 1 exiting the heat exchanger 2 may have a decreased temperature along with the decreased pressure.

In order to maximize heat absorption from the thermal energy source in the geothermal well, the primary fluid 1 may optionally be conveyed from the condenser 8 to a compressor 10 to increase the pressure of the primary fluid 1. In some embodiments however, the compressor 10 may not be required, and may be omitted. The compressor 10 may be a pump when the primary fluid 1 is in a liquid phase. The increase in pressure may change the primary fluid 1 leaving the compressor 10 to a liquid state with high pressure and low temperature. This high pressure, low temperature primary fluid 1 may then be conveyed back into the well to reabsorb heat provided by the thermal energy source from the geothermal energy source, as discussed above.

Figure 1B:
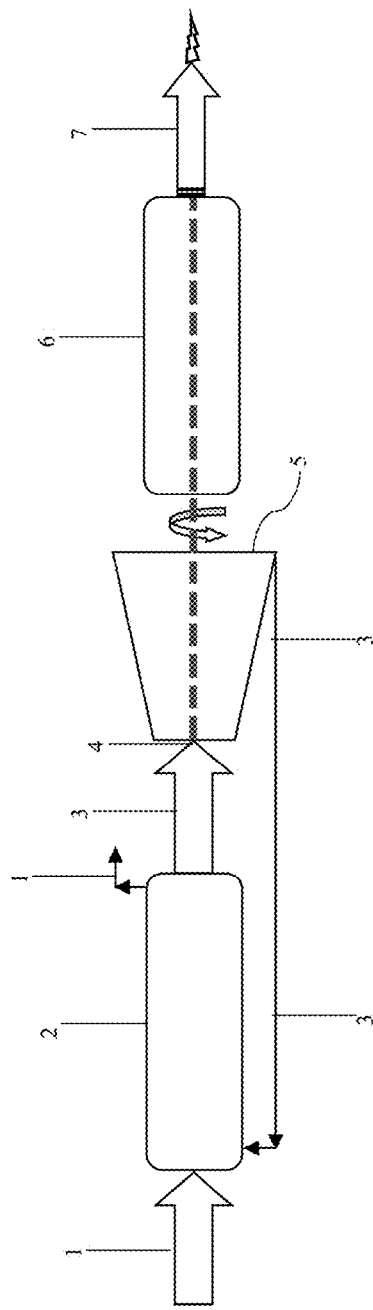
FIG. 1B is a schematic illustration of a geothermal power plant according to a second embodiment.

FIG. 1B illustrates a second embodiment of a geothermal power plant that can be used with a geothermal energy source in a well to generate electricity. The geothermal power plant in FIG. 1B is similar to the one described above with respect to FIG. 1A, and the component parts of the geothermal power plants identified with the same reference numerals in both embodiments may be the same and operate in the same manner. The geothermal power plant in FIG. 1B excludes the condenser 9 and the compressor 11 that is included in the geothermal power plant in FIG. 1A. Thus, in the geothermal power plant of FIG. 1B, the heated secondary fluid 3 exiting the turbine 5 is conveyed to the heat exchanger 2 in a low pressure, high temperature state. In the heat exchanger 2, the low pressure/high temperature heated secondary fluid 3 absorbs thermal energy from the heated primary fluid 1. The heated secondary fluid 3 may then be conveyed to the turbine 5 to drive the turbine 5 as discussed above. Optionally, the heated secondary fluid 3 may pass through the nozzle 4 before entering the turbine 5. The geothermal power plant in FIG. 1B also excludes the condenser 8 and the compressor 10 that accommodates the heated primary fluid 1 exiting the heat exchanger 2 in the geothermal power plant of FIG. 1A. In this case, the primary fluid 1 exiting the heat exchanger 2 may be conveyed back into the geothermal well without passing through the condenser 8 and the compressor 10, and again absorb thermal energy from the geothermal energy source. The heated primary fluid 1 may then be recirculated through the heat exchanger 2 to exchange the thermal energy with the secondary fluid 3 in a subsequent thermodynamic cycle.

Figure 1C:
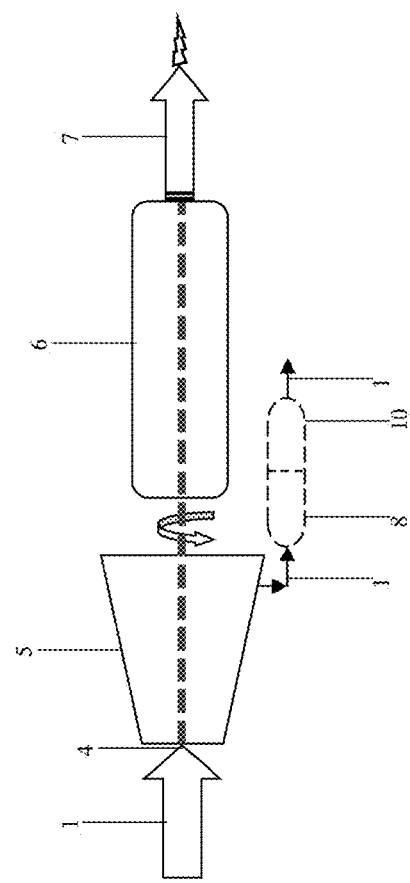
FIG. 1C is a schematic illustration of a geothermal power plant according to a third embodiment.

FIG. 1C illustrates a third embodiment of a geothermal power plant that can be used with a geothermal energy source in a well to generate electricity. The geothermal power plant in this embodiment is a "single fluid" system, as opposed to the "binary" systems in FIGS. 1A and 1B that implement both a primary fluid and a secondary fluid. In the "single fluid" system of FIG. 1C, the thermodynamic process implemented by the geothermal power plant uses only the primary fluid 1 to drive the turbine 5, and the heat exchanger 2 of FIGS. 1A and 1B is thus excluded. Other component parts that are shared by the geothermal power plants in FIG. 1A to 1C and identified with the same reference numerals may be the same and operate in the same manner. In the geothermal power plant of FIG. 1C, at least some portion of thermal energy from the geothermal energy source is transferred as heat to the primary fluid 1 by heat exchange. The primary fluid 1 absorbs the thermal energy of the geothermal energy source to raise the thermal energy and/or temperature of the primary fluid 1, as discussed above. As also discussed above, the transferred heat from the geothermal energy source can elevate the kinetic energy of the primary fluid 1 so that the heated primary fluid 1 may have a relatively high temperature and pressure. Upon absorbing the thermal energy (heat) from the geothermal energy source, the primary fluid 1 may increase its temperature, volume and pressure, and thus its enthalpy, and may change its phase/state from a liquid to a gas/vapor. The primary fluid 1 may also be heated to the extent that it reaches a supercritical state. In some instances, the heated primary fluid 1 may be considered as a kinetic energy fluid by virtue of its molecular movement.

In the geothermal power plant of FIG. 1C, the heated primary fluid 1 (e.g., having a high pressure and high temperature) flows from the well to the turbine 5. Optionally, the heated primary fluid 1 may pass through the nozzle 4 before entering the turbine 5. As the heated primary fluid 1, preferably in the supercritical gas state/phase, enters the turbine 5, its kinetic energy will exert a force to move the series of blades on the shaft of the turbine 5 as discussed above. As discussed above, the force turns the blades, which rotates the shaft to drive the turbine 5. The turbine 5, in turn, drives an electricity generator 6 to generate electricity 7 via electromagnetic induction. The electricity 7 produced can be extracted from the electricity generator 6 and sent to an electrical grid for commercial distribution and use. The frequency of the electricity 7 from the electricity generator 6 can be adjusted to the grid-line frequency of the grid to synchronize the transmission, as discussed above.

The pressure of the heated primary fluid 1 after driving the turbine 5 may be reduced, such that the heated primary fluid 1 exiting the turbine 5 is in a low pressure, high temperature state. In this state, the heated primary fluid 1 may be conveyed to the condenser 8 to reduce the temperature of the heated primary fluid 1. Reducing the temperature of the heated primary fluid 1 is beneficial because a lower (cooler) temperature allows the primary fluid 1 to subsequently absorb more heat from the thermal energy of the geothermal energy source, and thus increases the efficiency in reusing the primary fluid 1 in a cyclic thermodynamic process as discussed above. In an embodiment, the condenser 8 exchanges or extracts the heat of the high temperature primary fluid 1 (which may be in a superheated gas/vapor phase) with the ambient temperature of the air in the condenser 8 which causes the primary fluid 1 to cool. Thus, the primary fluid 1 exiting the condenser 8 may have a decreased temperature along with the decreased pressure.

The primary fluid 1 having a decreased temperature and pressure may be conveyed back into the geothermal well to be reheated by the geothermal energy source and used again in the energy generating process. In order to maximize heat absorption from the geothermal energy source, the primary fluid 1 conveyed from the condenser 8 may pass through the compressor 10 to increase the pressure of the primary fluid 1. The increase in pressure may change the primary fluid 1 leaving the compressor 8 to a liquid state with high pressure and low temperature. This high pressure, low temperature primary fluid 1 may then be conveyed back into the well to reabsorb heat provided by the thermal energy from the geothermal energy source. The process of generating electricity 7 from the geothermal energy source may then be repeated in a repetitive, cyclic manner to generate electricity 7 (e.g., green energy).

Figure 1D:
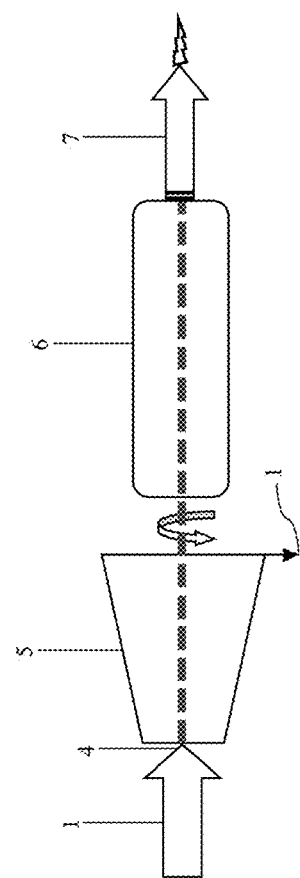
FIG. 1D is a schematic illustration of a geothermal power plant according to a fourth embodiment.

FIG. 1D illustrates a fourth embodiment of a geothermal power plant that can be used with a geothermal energy source in a well to generate electricity. The geothermal power plant in FIG. 1D is similar to the one described above with respect to FIG. 1C, and the component parts of the geothermal power plants identified with the same reference numerals in both embodiments may be the same and operate in the same manner. The geothermal power plant in FIG. 1D excludes the condenser 8 and the compressor 10 that is included in the geothermal power plant in FIG. 1C. Thus, in the geothermal power plant of FIG. 1D, the heated primary fluid 1 exiting the turbine 5 is conveyed to the well in a low pressure, high temperature state without passing through the condenser 8 and the compressor 10. In the well, the low pressure/high temperature heated primary fluid 1 absorbs thermal energy from the geothermal energy source. The heated primary fluid 1 may then be conveyed to the turbine 5 to drive the turbine 5 as discussed above. Optionally, the heated primary fluid 1 may pass through the nozzle 4 before entering the turbine 5.

Figure 2A:
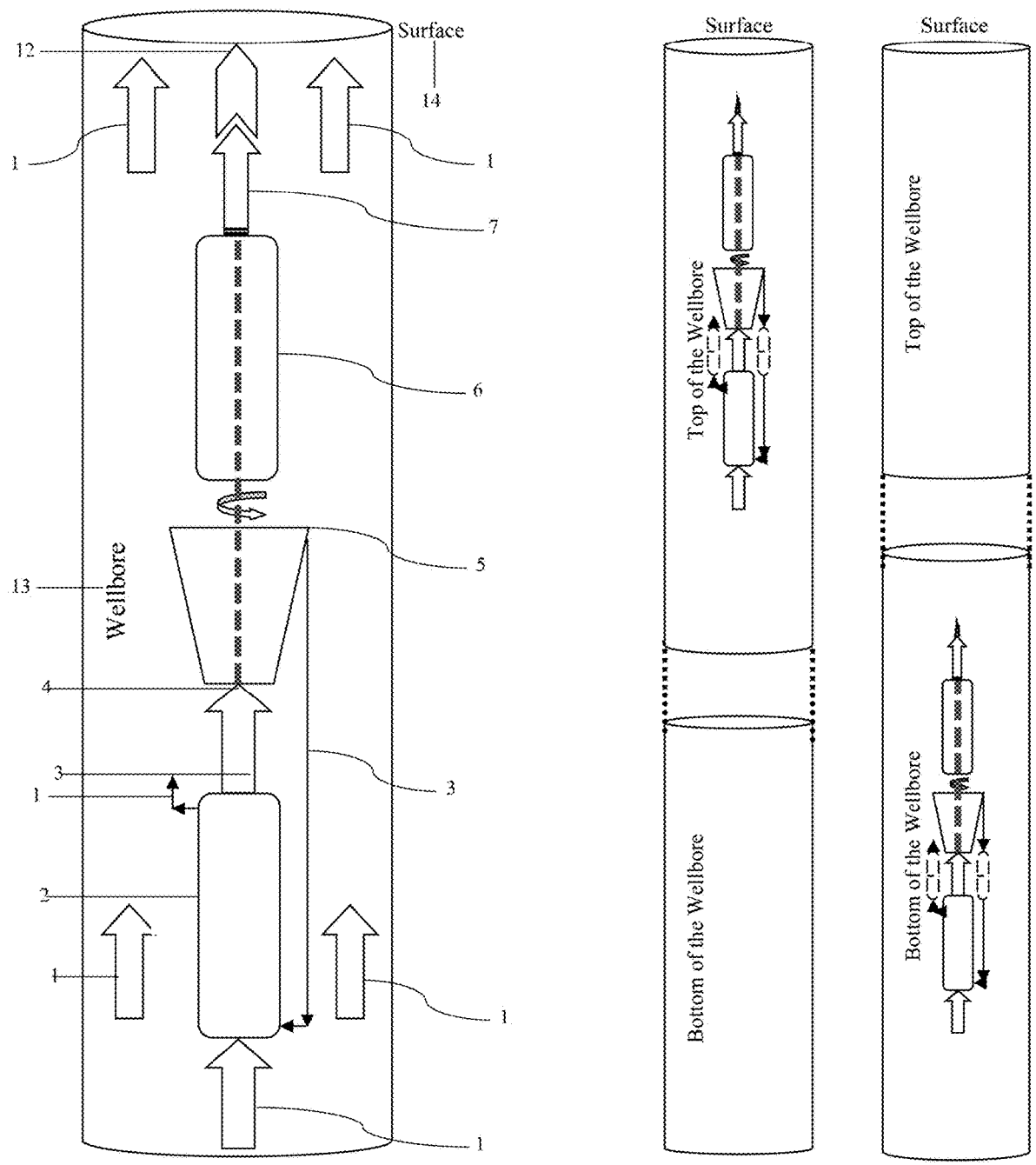
FIG. 2A is schematic illustration of a geothermal system for generating electricity including the geothermal power plant of FIG. 1B, according to an embodiment.

FIG. 2A illustrates one embodiment of a geothermal system for generating electricity. In this embodiment, the geothermal system includes the geothermal power plant of FIG. 1B which is completely inside a well 13 that extends from a surface 14 of the earth into an underground geologic formation. The well 13 extends to a geothermal energy source (not shown), which may be a hot rock formation or reservoir in the underground geologic formation as discussed above. A primary fluid 1 is circulated or otherwise provided in the well to absorb thermal energy from the geothermal energy source to produce a heated primary fluid 1 as discussed above. The geothermal power plant intakes the heated primary fluid 1 into the heat exchanger 2, and may operate in the manner discussed above with respect to FIG. 1B to generate electricity 7. In the system of FIG. 2A, the heated primary fluid 1 exiting the heat exchanger 2 may be directly recirculated within the well 13. The electricity 7 may be conveyed to outside of the well 13 via an electrical cable(s) 12 that may be encased in a conduit to protect the electrical cable(s) 12 in the well 13. The electrical cable(s) 12 may be connected outside of the well 13 to the electrical grid for commercial distribution and use as discussed above. In the geothermal system of FIG. 2A, the geothermal power plant is positioned completely inside of the well 13. That is, the heat exchanger 2, the secondary fluid 3, the nozzle 4, the turbine 5 and the electricity generator 6 are all provided inside of the well 13. The geothermal power plant may be positioned inside of the well 13 at a top part of the well close to the surface 14, or may be positioned inside of the well 13 at a bottom part of the well close to the geothermal energy source. Alternatively, the geothermal power plant may be positioned inside of the well 13 at a location between the top part of the well 13 and the bottom part of the well 13. In either of these cases, the geothermal power plant is thus essentially integrated with the well 13. The geothermal power plant may be anchored in the well 13 via, e.g., an attachment to the wellhead. The heat exchanger 2, the nozzle 4, the turbine 5 and the electricity generator 6 may be formed a material such as stainless steel, tungsten carbide, and/or other high pressure and high temperature resistant materials that can withstand the high pressures and high temperatures that can exist within the well 13. The electrical cable(s) 12/conduit may also be encased in a housing formed of high pressure and high temperature resistant materials that can withstand the high pressures and high temperatures that can exist within the well 13.

Positioning the geothermal power plant completely inside the well 13 as shown in FIG. 2A decreases the distance between the geothermal power plant and the geothermal energy source in the well 13 as compared to conventional systems in which the electricity generating components (e.g., heat exchanger, turbine and electricity generator) are disposed at a location far from the well—in some cases several miles away. In those conventional systems, thermal energy absorbed by a primary fluid from a geothermal energy source is lost during transportation of the primary fluid from the well to a heat exchanger at the far away location. The thermal energy loss occurs via conduction and/or radiation of the thermal energy from the primary fluid to the transportation system for conveying the primary fluid from the well (e.g., pipes or tubulars outside of the well), and/or to the surrounding environment. Decreasing the distance between the geothermal power plant and the geothermal energy source as in FIG. 2A helps prevent and/or reduce such thermal energy loss of the primary fluid 1 while the primary fluid 1 is conveyed to the heat exchanger 2. This is because the primary fluid 1 does not even leave the well 13 before entering the heat exchanger 2. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the heat exchanger 2. The shorter the distance the heated primary fluid 1 travels from the geothermal energy source to the heat exchanger 2, the less, if any, thermal energy is lost. This principle is reflected in the following equation:

$$Q \approx K \approx W \approx E \approx 1/D$$

where:
Q represents an Amount of Heat Transferred via thermal energy absorption from a thermal energy source;
K represents an Amount of Generated Kinetic Energy obtained by thermal energy absorption;
W represents an Amount of Work Done via the kinetic energy;
E represents an Amount of Generated Electricity via the work; and
D represents a distance between a thermal power plant and a thermal energy source.

As is apparent from the foregoing equation, the smaller the distance, the larger the value for variables Q, K, W and E. Thus, maintaining the amount of thermal energy absorbed by the primary fluid 1 from the geothermal energy source before the primary fluid 1 enters the heat exchanger 2 maximizes the amount of the thermal energy that is exchanged with the secondary fluid 3 in the heat exchanger 2, and thus increases the efficiency of the heat transfer from the primary fluid 1 to the secondary fluid 3. Maximizing the amount of the thermal energy that can be absorbed by the secondary fluid 3 in the heat exchanger increases the temperature and kinetic energy of the heated secondary fluid 3 so that the heated secondary fluid 3 can drive the turbine 5 with a greater force and/or velocity. Driving the turbine 5 with more force and/or velocity turns the turbine shaft faster, which creates more electromagnetic induction in the electricity generator 6 at a faster rate. As a result, the electricity generator 6 generates more electricity 7 at a faster rate. Decreasing the distance between the geothermal power plant and the geothermal energy source as in FIG. 2A therefore increases the efficiency and output of the geothermal power plant.

In the system of FIG. 2A, the distance between the geothermal power plant and the geothermal energy source may allow the heated primary fluid 1 to maintain a sufficient amount of thermal energy to change the secondary fluid 3 to a supercritical state or a gaseous state when absorbing the thermal energy from the primary fluid 1 in the heat exchanger 2. The secondary fluid 3 may thus be in a supercritical state or a gaseous state when entering the turbine 5 to drive the turbine 5 in the manner discussed above. In some cases, the primary fluid 1 may itself be changed to supercritical state or a gaseous state via the thermal energy source. Generally speaking, the distance between the geothermal power plant and the geothermal energy source should prevent the either the primary fluid 1 or the secondary fluid 3 from losing an amount of thermal energy that would result in the fluid having a two-phase state (i.e., liquid and gas). In the system of FIG. 2A, the distance between the geothermal power plant and the geothermal energy source is a predetermined distance of at most the depth of the well 13. The predetermined distance includes different depths within the well 13 as measured from the surface or the from the energy source.

Figure 2B:
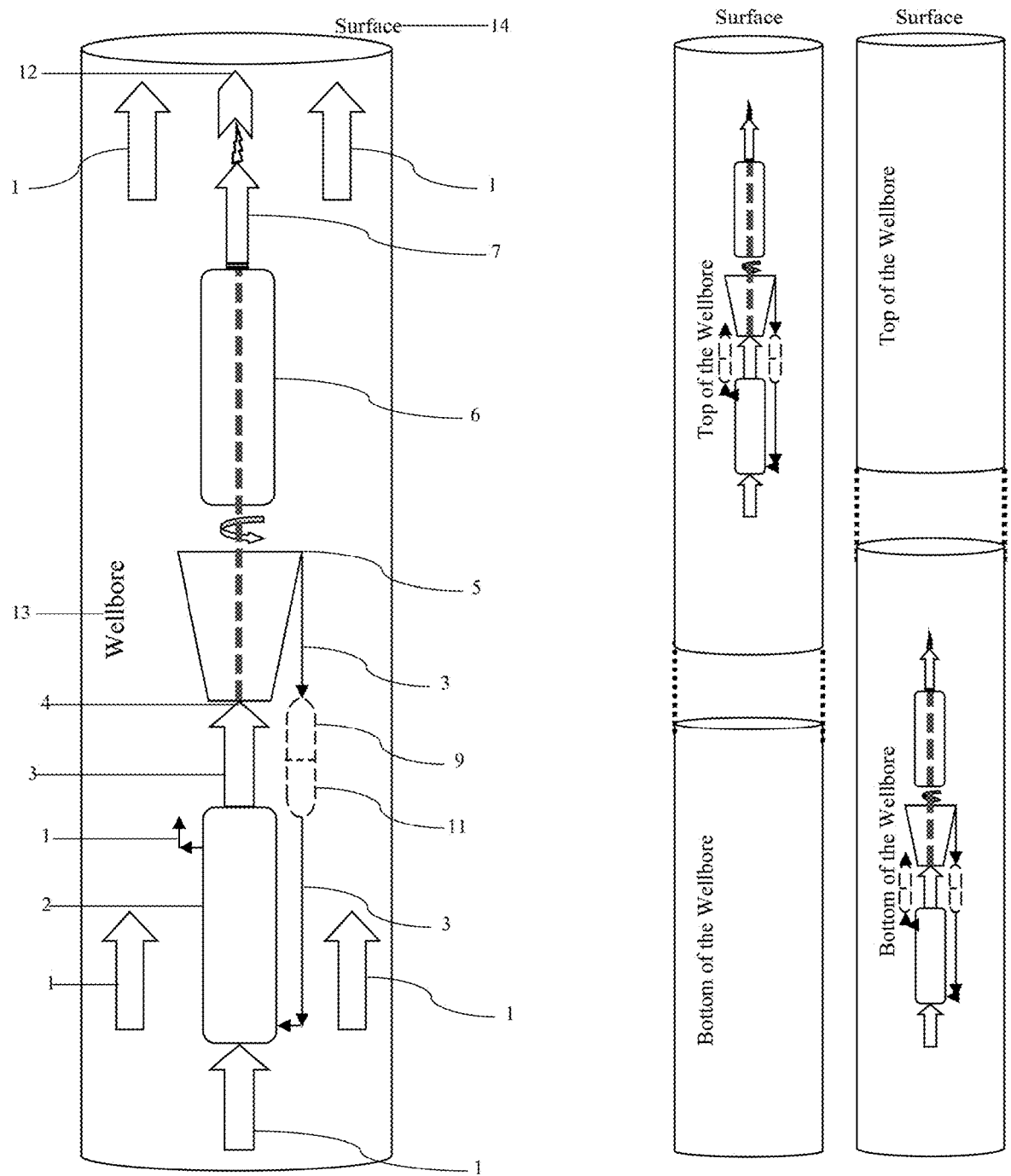
FIG. 2B is schematic illustration of a geothermal system for generating electricity including a geothermal power plant similar to the one in FIG. 1A, according to an embodiment.

FIG. 2B illustrates another embodiment of a geothermal system for generating electricity. This embodiment is similar to the one in FIG. 2A, but the geothermal system in FIG. 2B includes the geothermal power plant of FIG. 1A. That is, the geothermal power plant includes the condenser 9 and the compressor 11. The component parts of the geothermal systems and power plants identified with the same reference numerals in both embodiments may be the same and operate in the same manner. As in the previous embodiment, the geothermal power plant in the system of FIG. 2B is positioned completely inside the well 13. Thus, the relatively close distance between the geothermal power plant and the geothermal energy source in FIG. 2B may provide the system of FIG. 2B with the same benefits with respect to thermal energy, efficiency and electricity output as discussed above with respect to the system in FIG. 2A.

Figure 2C:
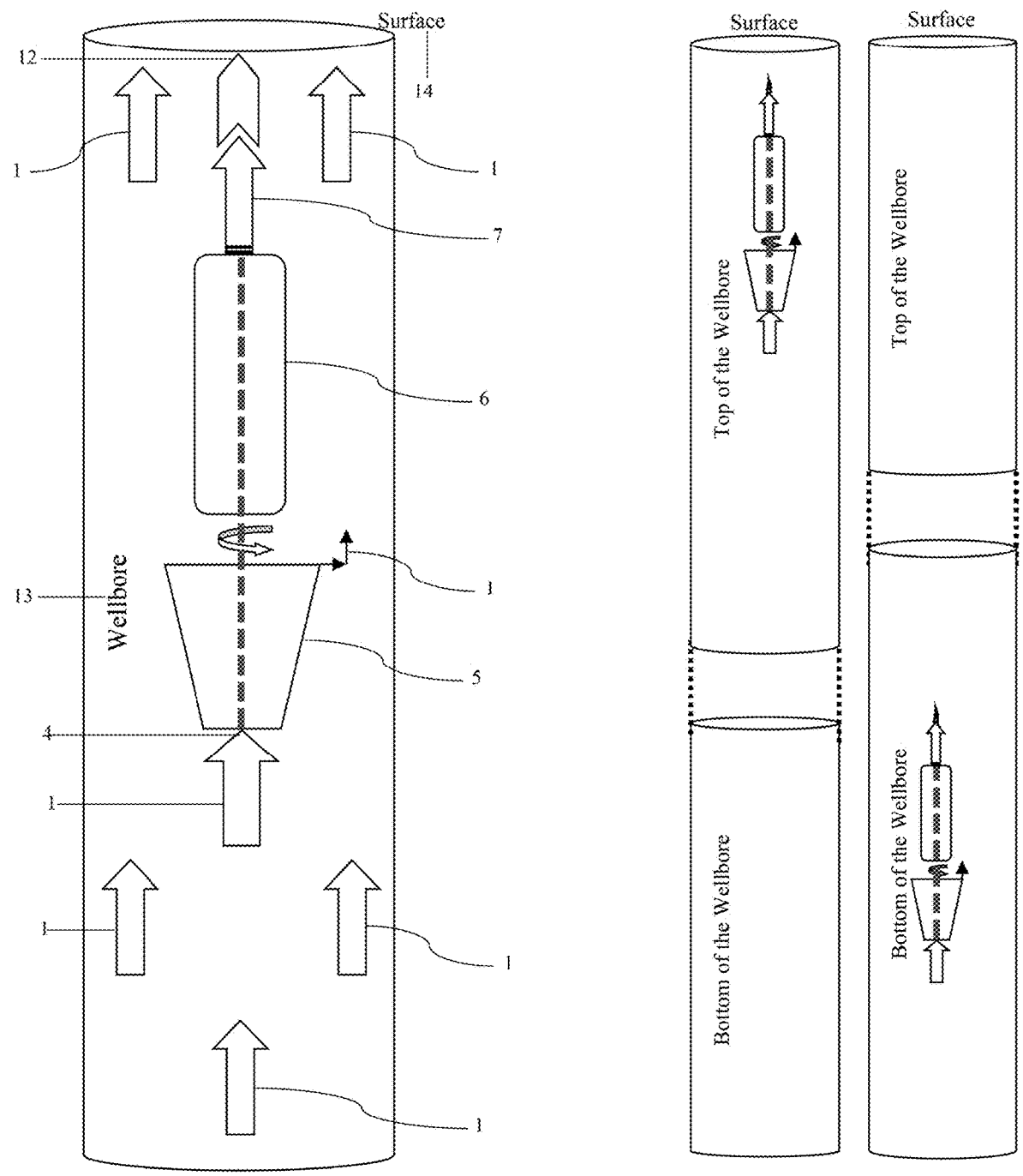
FIG. 2C is schematic illustration of a geothermal system for generating electricity including the geothermal power plant of FIG. 1D, according to an embodiment.

FIG. 2C illustrates a further embodiment of a geothermal system for generating electricity. This embodiment is similar to the one in FIG. 2A, but the geothermal system in FIG. 2C includes the "single fluid" geothermal power plant of FIG. 1D. That is, the geothermal power plant in FIG. 2C uses the primary fluid 1 to drive the turbine 5 as discussed above with respect to FIGS. 1C and 1D. The component parts of the geothermal systems and power plants identified with the same reference numerals in the above embodiments may be the same and operate in the same manner. As in the previous embodiment, the geothermal power plant in the system of FIG. 2C is positioned completely inside the well 13. In this regard, the primary fluid 1 does not even leave the well 13 before entering the turbine 5. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 drives the turbine 5. The shorter the distance the heated primary fluid 1 travels from the geothermal energy source to the turbine 5, the less, if any, thermal energy is lost.

Maintaining the amount of thermal energy absorbed by the primary fluid 1 from the geothermal energy maximizes the amount of kinetic energy in the primary fluid 1, and hence the potency in which the primary fluid 1 can drive the turbine 5. That is, maximizing the amount of amount of kinetic energy in the primary fluid 1 can enable the primary fluid 1 to drive the turbine 5 with a greater force and/or velocity. As discussed above, driving the turbine 5 with more force and/or velocity turns the turbine shaft faster, which creates more electromagnetic induction in the electricity generator 6 at a faster rate. As a result, the electricity generator 6 generates more electricity 7 at a faster rate. Thus, the relatively close distance between the geothermal power plant and the geothermal energy source in FIG. 2C may provide the system of FIG. 2C with the same benefits with respect to thermal energy, efficiency and electricity output as discussed above with respect to the system in FIG. 2A.

In the system of FIG. 2C, and primary fluid 1 may change to a supercritical state or a gaseous state when absorbing thermal energy from the geothermal energy source. The distance between the geothermal power plant and the geothermal energy source may allow the heated primary fluid 1 to maintain the supercritical state or gaseous state so that the primary fluid 1 may be in the supercritical state or the gaseous state when entering the turbine 5 to drive the turbine 5 in the manner discussed above. In the system of FIG. 2C, the distance between the geothermal power plant and the geothermal energy source is a predetermined distance of at most the depth of the well 13. The predetermined distance includes different depths within the well 13 as measured from the surface or the from the energy source.

Figure 2D:
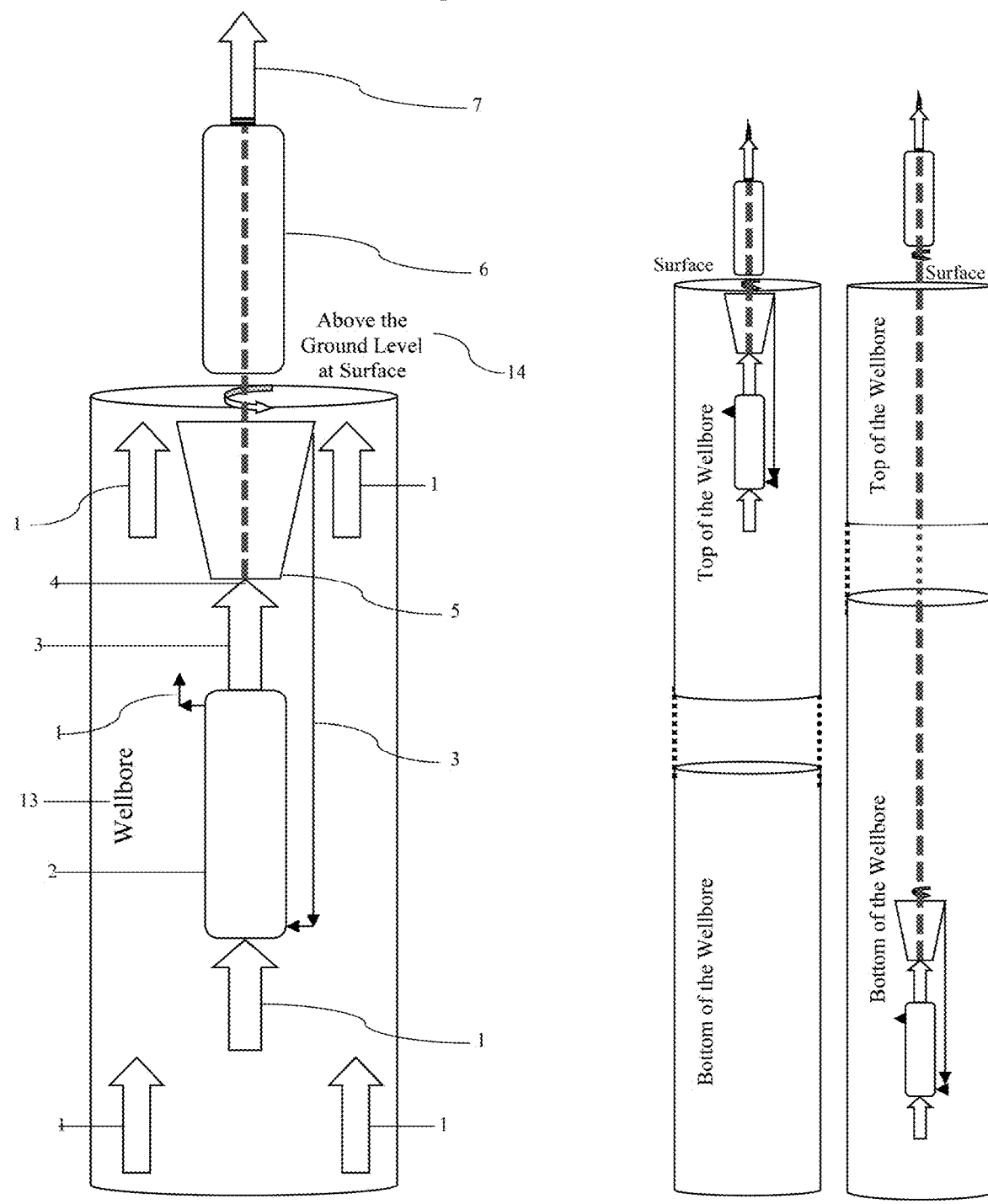
FIG. 2D is schematic illustration of a geothermal system for generating electricity including the geothermal power plant of FIG. 1B, according to another embodiment.

FIG. 2D illustrates another embodiment of a geothermal system for generating electricity. This embodiment is similar to the one in FIG. 2A, but in the geothermal system in FIG. 2D the geothermal power plant (similar to the geothermal power plant of FIG. 1B) is only partially inside of the well 13. In particular, the heat exchanger 2, the nozzle 4 and the turbine 5 are provided inside of the well, while the electricity generator 6 is provided outside of the well 13. The electricity generator 6 in this system may be provided at a wellhead above the well 13 or adjacent to the well 13 at the surface 14. The component parts of the geothermal systems and power plants identified with the same reference numerals in the embodiments of FIGS. 2A and 2D may be the same and operate in the same manner. With the electricity generator 6 provided at the wellhead above the well 13 or adjacent to the well 13 at the surface 14, the heat exchanger 2, the nozzle 4 and the turbine 5 may collectively or separately be positioned inside of the well 13 at a top part of the well close to the surface 14, inside of the well 13 at a bottom part of the well close to the geothermal energy source, or inside of the well 13 at a location between the top part of the well 13 and the bottom part of the well 13. In the system of FIG. 2D, the shaft of the turbine 5 may have a length sufficient to connect to the rotor of the electricity generator 6 so that the rotor would rotate with rotation of the shaft as discussed above. The electricity generator 6 in the embodiment of FIG. 2D may be provided outside of the well 13 to protect the electricity generator 6 from the conditions in the well 13, or for easier access to the electricity generator 6 for maintenance and repair. Meanwhile, the relatively close distance between the heat exchanger 2 inside of the well 13 and the geothermal energy source is preserved such that thermal energy loss of the primary fluid 1 that is conveyed to the heat exchanger 2 is prevented and/or reduced. Thus, the relatively close distance between some parts of the geothermal power plant (i.e., the heat exchanger 2, the nozzle 4 and the turbine 5) and the geothermal energy source in FIG. 2D may provide the system of FIG. 2D with the same benefits with respect to thermal energy, efficiency and electricity output as discussed above with respect to the system in FIG. 2A.

Figure 2E:
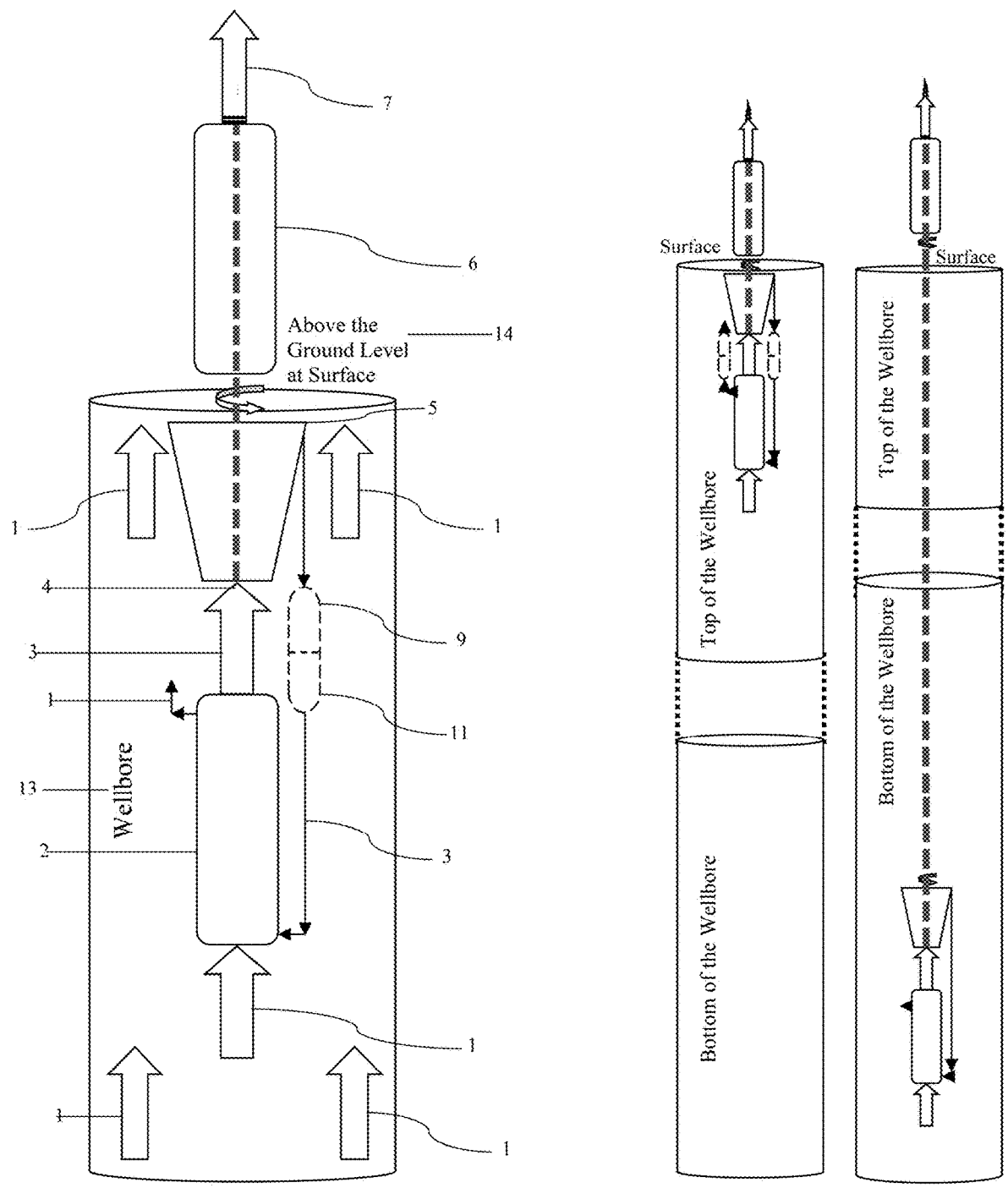
FIG. 2E is schematic illustration of a geothermal system for generating electricity including a geothermal power plant similar to the one in FIG. 1A, according to another embodiment.

FIG. 2E illustrates yet another embodiment of a geothermal system for generating electricity. This embodiment is similar to the one in FIG. 2D, but in the geothermal system in FIG. 2E the geothermal power plant includes the condenser 9 and the compressor 11 which are provided inside of the well 13. That is, the heat exchanger 2, the nozzle 4, the turbine 5, the condenser 9 and the compressor 11 are provided inside of the well, while the electricity generator 6 is provided outside of the well 13 at a wellhead above the well 13 or adjacent to the well 13 at the surface 14. The component parts of the geothermal systems and power plants identified with the same reference numerals in the embodiments of FIGS. 2D and 2E may be the same and operate in the same manner. The condenser 9 and the compressor 11 may be formed a material such as stainless steel, tungsten carbide, and/or other high pressure and high temperature resistant materials that can withstand the high pressures and high temperatures that can exist within the well 13. The relatively close distance between some parts of the geothermal power plant (i.e., the heat exchanger 2, the nozzle 4, the turbine 5, the condenser 9 and the compressor 11) and the geothermal energy source in FIG. 2E may provide the system of FIG. 2E with the same benefits with respect to thermal energy, efficiency and electricity output as discussed above with respect to the systems in FIGS. 2A and 2E.

Figure 2F:
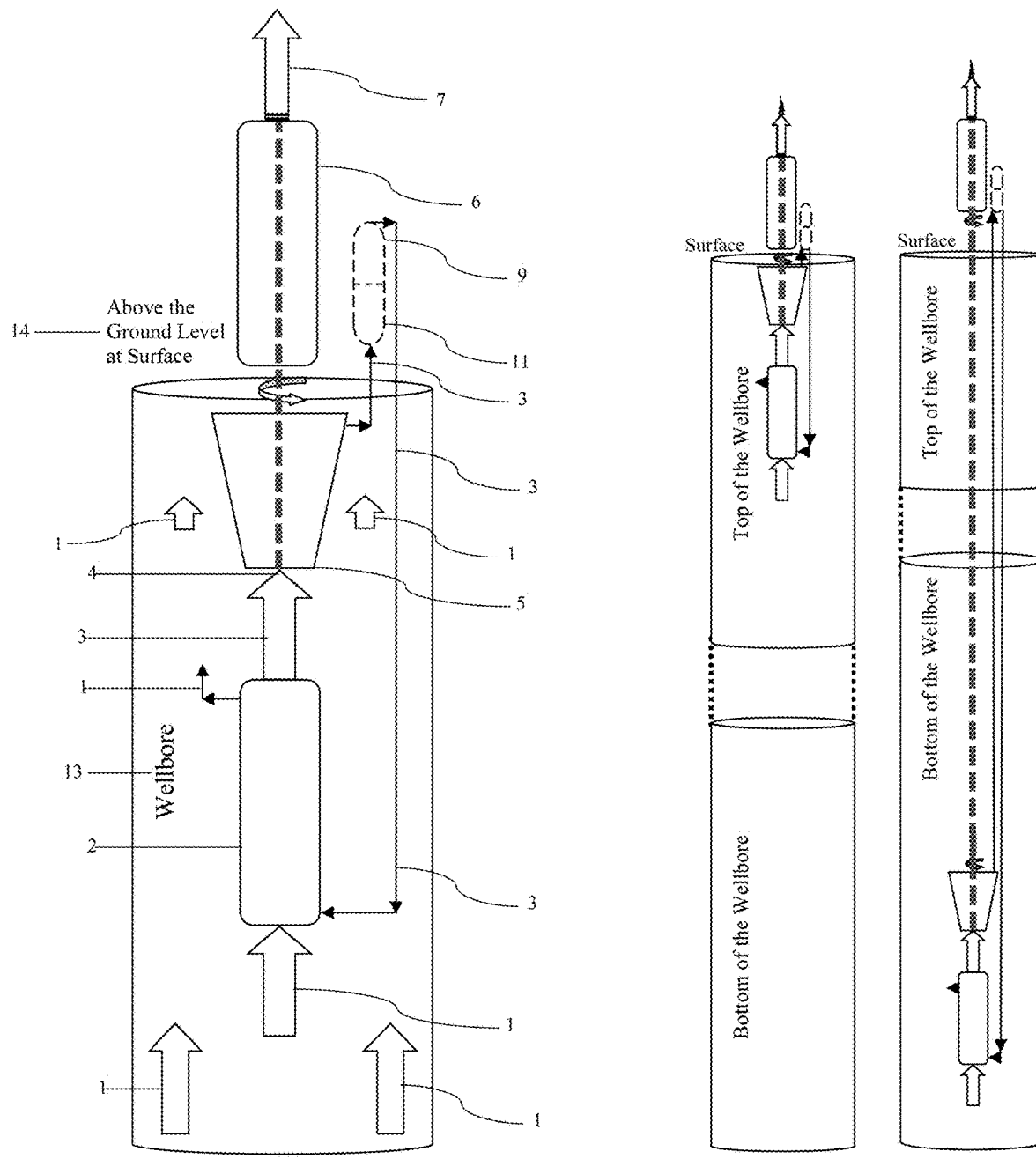
FIG. 2F is schematic illustration of a geothermal system for generating electricity including a geothermal power plant similar to the one in FIG. 1A, according to a further embodiment.

FIG. 2F illustrates a further embodiment of a geothermal system for generating electricity. This embodiment is similar to the one in FIG. 2E, but in the geothermal system in FIG. 2F the condenser 9 and the compressor 11 are outside of the well 13. That is, the heat exchanger 2, the nozzle 4 and the turbine 5 are provided inside of the well, while the condenser 9, the compressor 11 and the electricity generator 6 is provided outside of the well 13 at a wellhead above the well 13 or adjacent to the well 13 at the surface 14. The component parts of the geothermal systems and power plants identified with the same reference numerals in the embodiments of FIGS. 2D to 2F may be the same and operate in the same manner. The condenser 9 and the compressor 11 in the embodiment of FIG. 2F may be provided outside of the well 13 to protect the condenser 9 and the compressor 11 from the conditions in the well 13, or for easier access to the condenser 9 and the compressor 11 for maintenance and repair. The relatively close distance between the other parts of the geothermal power plant (i.e., the heat exchanger 2, the nozzle 4 and the turbine 5) and the geothermal energy source in FIG. 2F may provide the system of FIG. 2F with the same benefits with respect to thermal energy, efficiency and electricity output as discussed above with respect to the systems in FIGS. 2A, 2D and 2E.

Figure 2G:
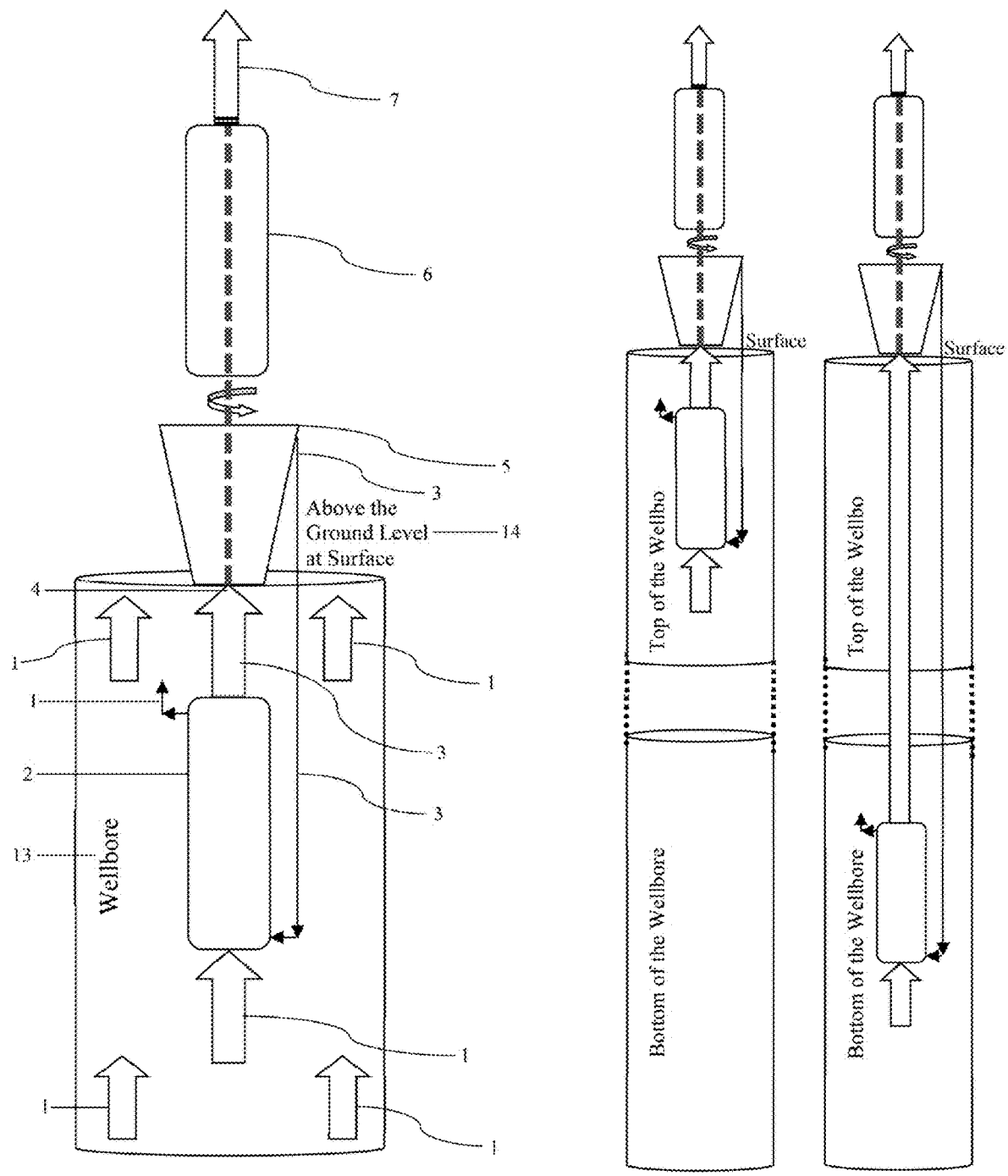
FIG. 2G is schematic illustration of a geothermal system for generating electricity including a geothermal power plant similar to the one in FIG. 1B, according to another embodiment.

FIG. 2G illustrates yet another embodiment of a geothermal system for generating electricity. This embodiment is similar to the one in FIG. 2D in which the geothermal power plant (similar to the geothermal power plant of FIG. 1B) is only partially inside of the well 13. But in the geothermal system in FIG. 2G, the turbine 5 is provided outside of the well 13 along with the electricity generator 6. Meanwhile, the heat exchanger 2 and optionally the nozzle 4 are provided inside of the well. The turbine 5 and the electricity generator 6 in this system may be provided at a wellhead above the well 13 or adjacent to the well 13 at the surface 14. The component parts of the geothermal systems and power plants identified with the same reference numerals in the embodiments of FIGS. 2D and 2G may be the same and operate in the same manner. With the turbine 5 and the electricity generator 6 provided at the wellhead above the well 13 or adjacent to the well 13 at the surface 14, the heat exchanger 2 and optionally the nozzle 4 may collectively or separately be positioned inside of the well 13 at a top part of the well close to the surface 14, inside of the well 13 at a bottom part of the well close to the geothermal energy source, or inside of the well 13 at a location between the top part of the well 13 and the bottom part of the well 13. The turbine 5 and the electricity generator 6 in the embodiment of FIG. 2G may be provided outside of the well 13 to protect them from the conditions in the well 13, or for easier access for maintenance and repair. Meanwhile, the relatively close distance between the heat exchanger 2 inside of the well 13 and the geothermal energy source is preserved such that thermal energy loss of the primary fluid 1 that is conveyed to the heat exchanger 2 is prevented and/or reduced. Thus, the relatively close distance between some parts of the geothermal power plant (i.e., the heat exchanger 2 and optionally the nozzle 4) and the geothermal energy source in FIG. 2G may provide the system of FIG. 2G with the same benefits with respect to thermal energy, efficiency and electricity output as discussed above with respect to the system in FIGS. 2A and 2D.

Figure 2H:
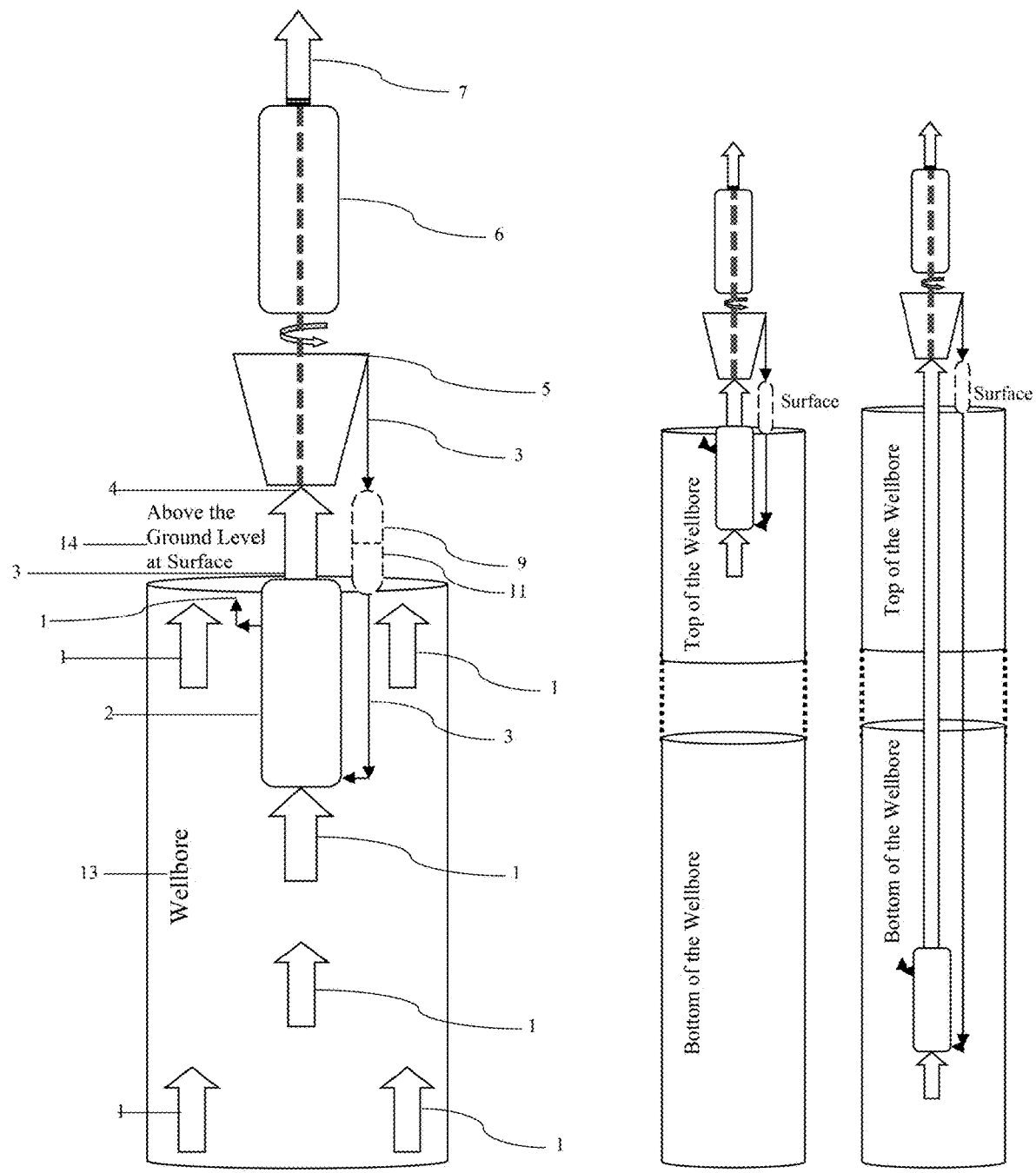
FIG. 2H is schematic illustration of a geothermal system for generating electricity including a geothermal power plant similar to the one in FIG. 1A, according to a further embodiment.

FIG. 2H illustrates a further embodiment of a geothermal system for generating electricity. This embodiment is similar to the ones in FIGS. 2F and 2G in which the geothermal power plant (similar to the geothermal power plant of FIG. 1A) is only partially inside of the well 13. But in the geothermal system in FIG. 2H, the condenser 9 and the compressor 11 are provided outside of the well 13 along with the turbine 5 and electricity generator 6. Meanwhile, the heat exchanger 2 and optionally the nozzle 4 are provided inside of the well. The component parts of the geothermal systems and power plants identified with the same reference numerals in the embodiments of FIGS. 2F to 2H may be the same and operate in the same manner. The condenser 9 and the compressor 11 in the embodiment of FIG. 2F may be provided outside of the well 13 to protect the condenser 9 and the compressor 11 from the conditions in the well 13, or for easier access to the condenser 9 and the compressor 11 for maintenance and repair. The relatively close distance between the other parts of the geothermal power plant (i.e., the heat exchanger 2 and optionally the nozzle 4) and the geothermal energy source in FIG. 2H may provide the system of FIG. 2H with the same benefits with respect to thermal energy, efficiency and electricity output as discussed above with respect to the systems in FIGS. 2A and 2F to 2H.

Figure 2I:
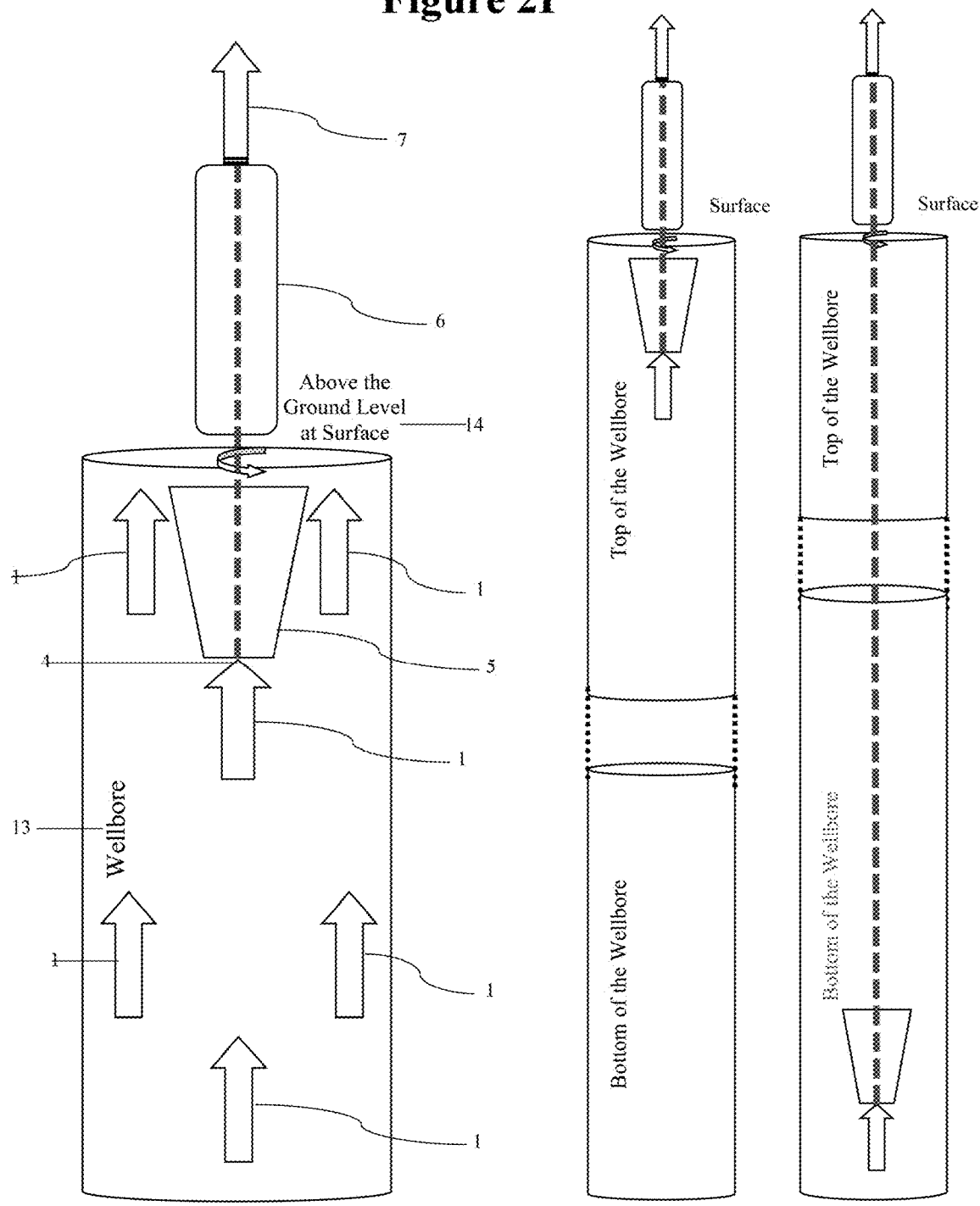
FIG. 2I is schematic illustration of a geothermal system for generating electricity including a geothermal power plant similar to the one in FIG. 1D, according to another embodiment.

FIG. 2I illustrates another embodiment of a geothermal system for generating electricity. This embodiment is similar to the one in FIG. 2C, but in the geothermal system in FIG.

2I the geothermal power plant (similar to the geothermal power plant of FIG. 1D) is only partially inside of the well 13. In particular, the turbine 5 is provided inside of the well, while the electricity generator 6 is provided outside of the well 13. The electricity generator 6 in this system may be provided at a wellhead above the well 13 or adjacent to the well 13 at the surface 14. The component parts of the geothermal systems and power plants identified with the same reference numerals in the embodiments of FIGS. 2C and 2I may be the same and operate in the same manner. With the electricity generator 6 provided at the wellhead above the well 13 or adjacent to the well 13 at the surface 14, the turbine 5 may be positioned inside of the well 13 at a top part of the well close to the surface 14, inside of the well 13 at a bottom part of the well close to the geothermal energy source, or inside of the well 13 at a location between the top part of the well 13 and the bottom part of the well 13. In the system of FIG. 2I, the shaft of the turbine 5 may have a length sufficient to connect to the rotor of the electricity generator 6 so that the rotor would rotate with rotation of the shaft as discussed above. The electricity generator 6 in the embodiment of FIG. 2I may be provided outside of the well 13 to protect the electricity generator 6 from the conditions in the well 13, or for easier access to the electricity generator 6 for maintenance and repair. Meanwhile, the relatively close distance between the turbine 5 inside of the well 13 and the geothermal energy source is preserved such that thermal energy loss of the primary fluid 1 that is conveyed to the turbine 5 is prevented and/or reduced. Thus, the relatively close distance between some parts of the geothermal power plant (i.e., the turbine 5) and the geothermal energy source in FIG. 2I may provide the system of FIG. 2I with the same benefits with respect to thermal energy, efficiency and electricity output as discussed above with respect to the system in FIGS. 2A and 2C.

FIG. 3A illustrates an embodiment of another geothermal system for generating electricity. In this embodiment, the geothermal system includes the geothermal power plant of FIG. 1A. In this case, the geothermal power plant is positioned at a wellhead above a well 13. For instance, the geothermal power plant may be positioned at a "Christmas Tree" above the well 13. The well 13 may extend to a geothermal energy source (not shown), which may be a hot rock formation or reservoir in the underground geologic formation as discussed above. The component parts of the geothermal systems and power plants identified with the same reference numerals in the above embodiments may be the same and operate in the same manner. A primary fluid 1 is circulated or otherwise provided in the well to absorb thermal energy from the geothermal energy source to produce a heated primary fluid 1 as discussed above. The geothermal power plant intakes the heated primary fluid 1 into the heat exchanger 2, and may operate in the manner discussed above with respect to FIG. 1A to generate electricity 7. The electricity 7 may be conveyed to the electrical grid for commercial distribution and use as discussed above. Positioning the geothermal power plant at a wellhead above a well 13 as shown in FIG. 3A decreases the distance between the geothermal power plant and the geothermal energy source in the well 13 as compared to conventional systems in which the electricity generating components (e.g., heat exchanger, turbine and electricity generator) are disposed at a location far from the well. As discussed above, the thermal energy absorbed by a primary fluid from a geothermal energy source in those systems is lost during transportation of the primary fluid from the well to a heat exchanger at the far away location. The thermal energy loss occurs via conduction and/or radiation of the thermal energy from the primary fluid to the transportation system for conveying the primary fluid from the well (e.g., pipes or tubulars outside of the well), and/or to the surrounding environment. Decreasing the distance between the geothermal power plant and the geothermal energy source as in FIG. 3A helps prevent and/or reduce such thermal energy loss of the primary fluid 1 while the primary fluid 1 is conveyed to the heat exchanger 2. This is because the primary fluid 1 barely leaves the well 13 before entering the heat exchanger 2 at the wellhead. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the heat exchanger 2.

As discussed above, maintaining the amount of thermal energy absorbed by the primary fluid 1 from the geothermal energy source before the primary fluid 1 enters the heat exchanger 2 maximizes the amount of the thermal energy that is exchanged with the secondary fluid 3 in the heat exchanger 2, and thus increases the efficiency of the heat transfer from the primary fluid 1 to the secondary fluid 3. Maximizing the amount of the thermal energy that can be absorbed by the secondary fluid 3 in the heat exchanger increases the temperature and kinetic energy of the heated secondary fluid 3 so that the heated secondary fluid 3 can drive the turbine 5 with a greater force and/or velocity. Driving the turbine 5 with more force and/or velocity turns the turbine shaft faster, which creates more electromagnetic induction in the electricity generator 6 at a faster rate. As a result, the electricity generator 6 generates more electricity 7 at a faster rate. Decreasing the distance between the geothermal power plant and the geothermal energy source as in FIG. 3A therefore increases the efficiency and output of the geothermal power plant.

In the system of FIG. 3A, the distance between the geothermal power plant and the geothermal energy source may allow the heated primary fluid 1 to maintain a sufficient amount of thermal energy to change the secondary fluid 3 to a supercritical state or a gaseous state when absorbing the thermal energy from the primary fluid 1 in the heat exchanger 2. The secondary fluid 3 may thus be in a supercritical state or a gaseous state when entering the turbine 5 to drive the turbine 5 in the manner discussed above. In some cases, the primary fluid 1 may itself be changed to supercritical state or a gaseous state via the thermal energy source. In the system of FIG. 3A, the distance between the geothermal power plant and the geothermal energy source is a predetermined distance of the depth of the well 13.

Figure 3B:
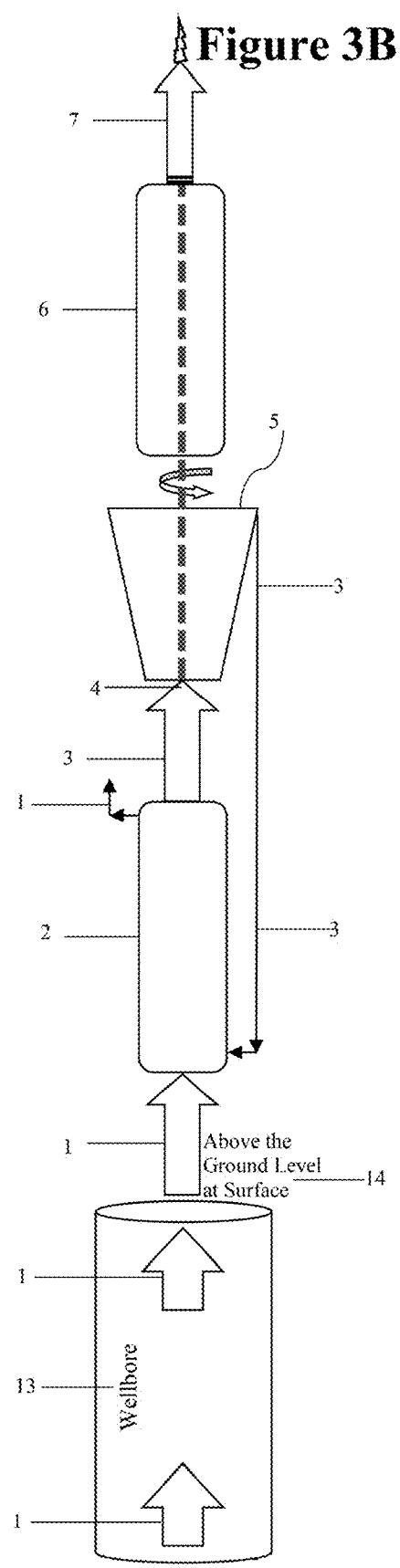
FIG. 3B is a schematic illustration of another geothermal system for generating electricity in which the geothermal power plant is positioned at a wellhead according to another embodiment.

FIG. 3B illustrates an embodiment of another geothermal system for generating electricity. In this embodiment, the geothermal system includes the geothermal power plant of FIG. 1B which is positioned at a wellhead above a well 13 as discussed above with respect to FIG. 3A. The geothermal power plant intakes the heated primary fluid 1 into the heat exchanger 2, and may operate in the manner discussed above with respect to FIG. 1B to generate electricity 7. Positioning the geothermal power plant at a wellhead above a well 13 as shown in FIG. 3B decreases the distance between the geothermal power plant and the geothermal energy source in the well 13 as compared to conventional systems in which the electricity generating components (e.g., heat exchanger, turbine and electricity generator) are disposed at a location far from the well, as discussed above. Thus, the relatively close distance between the geothermal power plant and the geothermal energy source in FIG. 3B may provide the system of FIG. 3B with the same benefits with respect to thermal energy, efficiency and electricity output as discussed above with respect to the system in FIG. 3A.

Figure 3C:
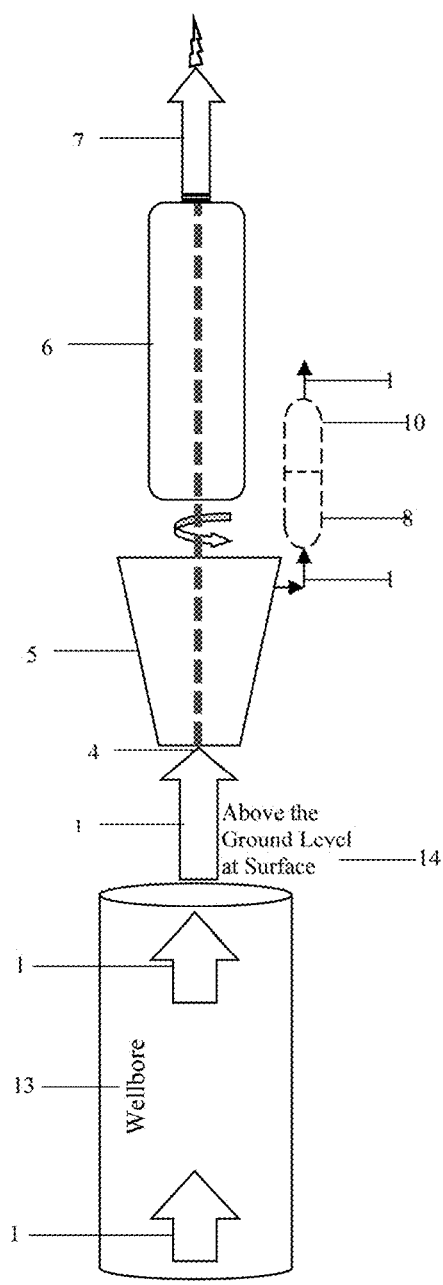
FIG. 3C is a schematic illustration of a further geothermal system for generating electricity in which the geothermal power plant is positioned at a wellhead according to a further embodiment.

FIG. 3C illustrates a further embodiment of another geothermal system for generating electricity. In this embodiment, the geothermal system includes the "single fluid" geothermal power plant of FIG. 1C that is positioned at the wellhead of the well 13. For instance, the geothermal power plant may be positioned at a "Christmas Tree" above the well 13. The well 13 may extend to a geothermal energy source (not shown), which may be a hot rock formation or reservoir in the underground geologic formation as discussed above. The geothermal power plant in FIG. 3C uses the primary fluid 1 to drive the turbine 5 as discussed above with respect to FIG. 1C. The component parts of the geothermal systems and power plants identified with the same reference numerals in the above embodiments may be the same and operate in the same manner. Positioning the geothermal power plant at a wellhead above a well 13 as shown in FIG. 3C decreases the distance between the geothermal power plant and the geothermal energy source in the well 13 as compared to conventional systems, as discussed above. Decreasing the distance between the geothermal power plant and the geothermal energy source as in FIG. 3C helps prevent and/or reduce such thermal energy loss of the primary fluid 1 while the primary fluid 1 is conveyed to the turbine 5. This is because the primary fluid 1 barely leaves the well 13 before entering the turbine 5 at the wellhead. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the turbine 5. Maintaining the amount of thermal energy absorbed by the primary fluid 1 from the geothermal energy maximizes the amount of kinetic energy in the primary fluid 1, and hence the potency in which the primary fluid 1 can drive the turbine 5. That is, maximizing the amount of amount of kinetic energy in the primary fluid 1 can enable the primary fluid 1 to drive the turbine 5 with a greater force and/or velocity. As discussed above, driving the turbine 5 with more force and/or velocity turns the turbine shaft faster, which creates more electromagnetic induction in the electricity generator 6 at a faster rate. As a result, the electricity generator 6 generates more electricity 7 at a faster rate. Thus, the relatively close distance between the geothermal power plant and the geothermal energy source in FIG. 3C may provide the system of FIG. 3C with the same benefits with respect to thermal energy, efficiency and electricity output as discussed above with respect to the system in FIG. 3A.

In the system of FIG. 3C, and primary fluid 1 may change to a supercritical state or a gaseous state when absorbing thermal energy from the geothermal energy source. The distance between the geothermal power plant and the geothermal energy source may allow the heated primary fluid 1 to maintain the supercritical state or gaseous state so that the primary fluid 1 may be in the supercritical state or the gaseous state when entering the turbine 5 to drive the turbine 5 in the manner discussed above. In the system of FIG. 3C, the distance between the geothermal power plant and the geothermal energy source is a predetermined distance of at most the depth of the well 13.

Figure 3D:
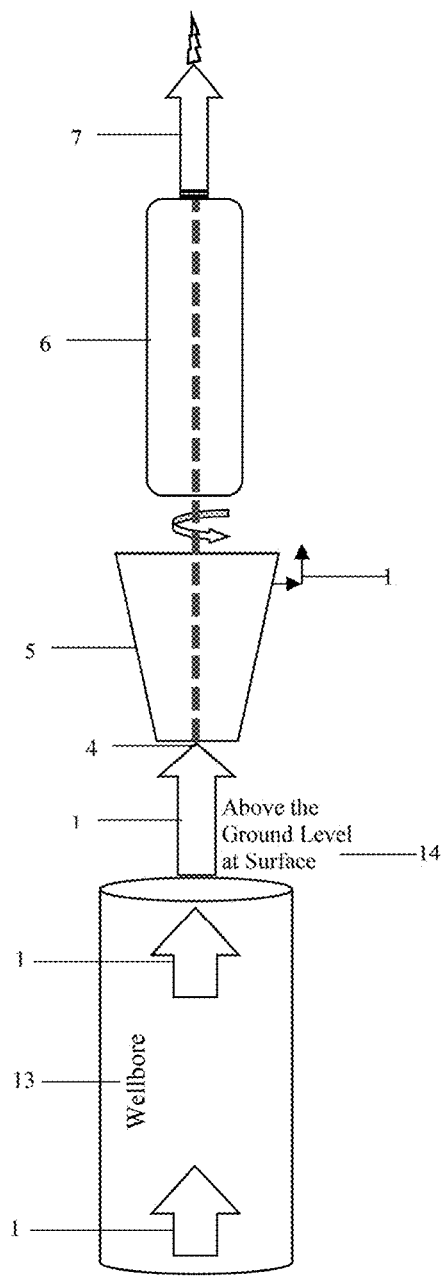
FIG. 3D is a schematic illustration of yet another geothermal system for generating electricity in which the geothermal power plant is positioned at a wellhead according to yet another embodiment.

FIG. 3D illustrates a yet another embodiment of another geothermal system for generating electricity. In this embodiment, the geothermal system includes the geothermal power plant of FIG. 1D which is positioned at a wellhead of the well 13 as discussed above with respect to FIG. 3C. The geothermal power plant intakes the heated primary fluid 1 into the turbine 5, and may operate in the manner discussed above with respect to FIG. 1D to generate electricity 7. Positioning the geothermal power plant at a wellhead above a well 13 as shown in FIG. 3D decreases the distance between the geothermal power plant and the geothermal energy source in the well 13 as compared to conventional systems in which the electricity generating components (e.g., heat exchanger, turbine and electricity generator) are disposed at a location far from the well, as discussed above. Thus, the relatively close distance between the geothermal power plant and the geothermal energy source in FIG. 3D may provide the system of FIG. 3D with the same benefits with respect to thermal energy, efficiency and electricity output as discussed above with respect to the system in FIG. 3C.

Figure 3E:
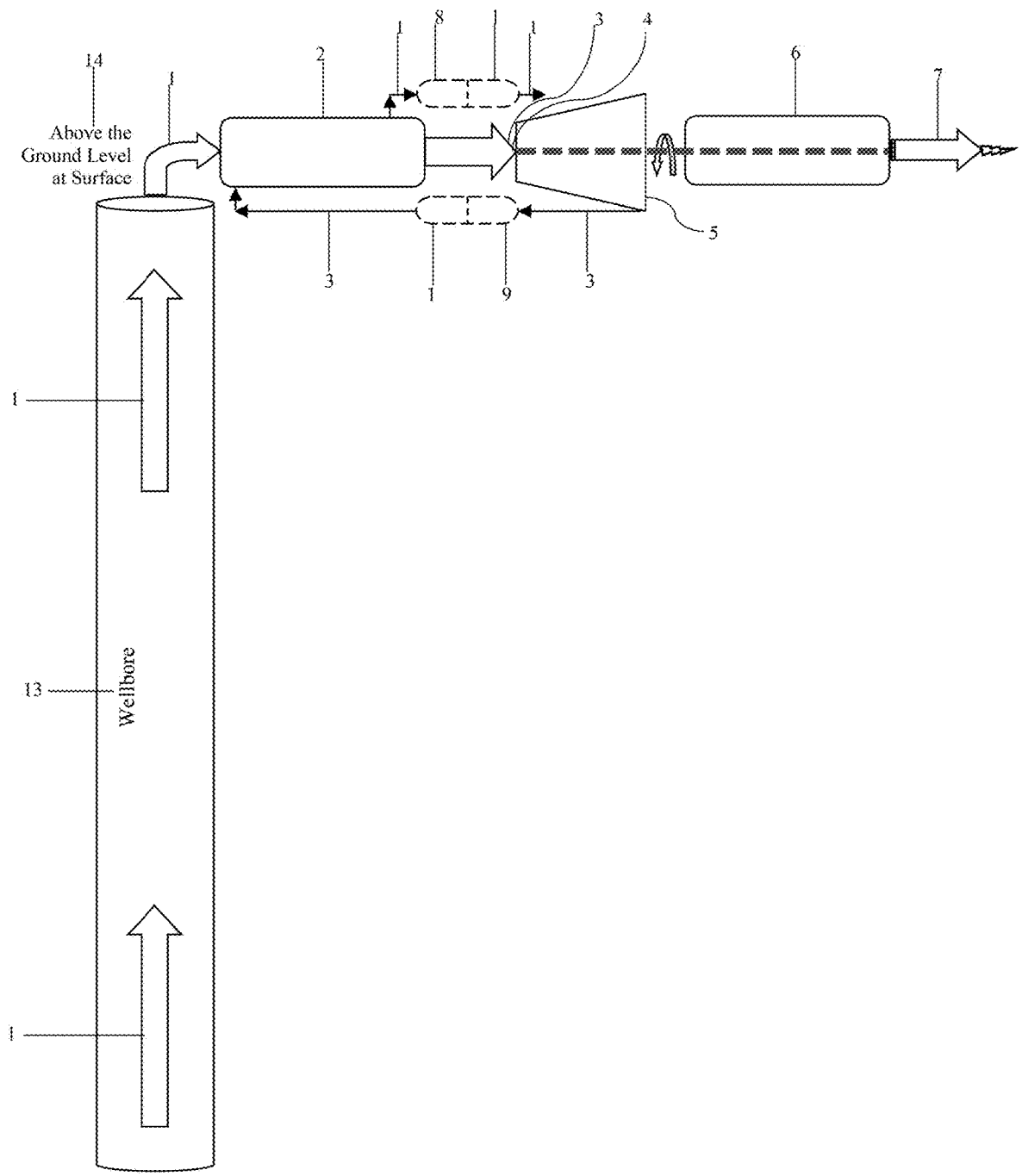
FIG. 3E is a schematic illustration of a geothermal system for generating electricity in which the geothermal power plant is positioned adjacent to a wellhead according to an embodiment.

FIG. 3E illustrates an embodiment of a geothermal system for generating electricity in which the geothermal power plant is positioned adjacent to the wellhead of the well 13. "Adjacent to" means at the surface 14 next to the wellhead of the well 13 on a well pad (the pad is discussed in further detail below with respect to FIGS. 4A to 4D). The well 13 may extend to a geothermal energy source (not shown), which may be a hot rock formation or reservoir in the underground geologic formation as discussed above. In this embodiment, the geothermal system includes the geothermal power plant of FIG. 1A. The component parts of the geothermal systems and power plants identified with the same reference numerals in the above embodiments may be the same and operate in the same manner. A primary fluid 1 is circulated or otherwise provided in the well to absorb thermal energy from the geothermal energy source to produce a heated primary fluid 1 as discussed above. The geothermal power plant intakes the heated primary fluid 1 into the heat exchanger 2, and may operate in the manner discussed above with respect to FIG. 1A to generate electricity 7. The electricity 7 may be conveyed to the electrical grid for commercial distribution and use as discussed above. Positioning the geothermal power plant adjacent to the wellhead as shown in FIG. 3E decreases the distance between the geothermal power plant and the geothermal energy source in the well 13 as compared to conventional systems in which the electricity generating components (e.g., heat exchanger, turbine and electricity generator) are disposed at a location far from the well. As discussed above, the thermal energy absorbed by a primary fluid from a geothermal energy source in those systems is lost during transportation of the primary fluid from the well to a heat exchanger at the far away location. The thermal energy loss occurs via conduction and/or radiation of the thermal energy from the primary fluid to the transportation system for conveying the primary fluid from the well (e.g., pipes or tubulars outside of the well), and/or to the surrounding environment. Decreasing the distance between the geothermal power plant and the geothermal energy source as in FIG. 3E helps prevent and/or reduce such thermal energy loss of the primary fluid 1 while the primary fluid 1 is conveyed to the heat exchanger 2. This is because the primary fluid 1 does not travel far from the well 13 before entering the heat exchanger 2 positioned adjacent to the well 13. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the heat exchanger 2.

As discussed above, maintaining the amount of thermal energy absorbed by the primary fluid 1 from the geothermal energy source before the primary fluid 1 enters the heat exchanger 2 maximizes the amount of the thermal energy that is exchanged with the secondary fluid 3 in the heat exchanger 2, and thus increases the efficiency of the heat transfer from the primary fluid 1 to the secondary fluid 3. Maximizing the amount of the thermal energy that can be absorbed by the secondary fluid 3 in the heat exchanger increases the temperature and kinetic energy of the heated secondary fluid 3 so that the heated secondary fluid 3 can drive the turbine 5 with a greater force and/or velocity. Driving the turbine 5 with more force and/or velocity turns the turbine shaft faster, which creates more electromagnetic induction in the electricity generator 6 at a faster rate. As a result, the electricity generator 6 generates more electricity 7 at a faster rate. Decreasing the distance between the geothermal power plant and the geothermal energy source as in FIG. 3E therefore increases the efficiency and output of the geothermal power plant.

In the system of FIG. 3E, the distance between the geothermal power plant and the geothermal energy source may allow the heated primary fluid 1 to maintain a sufficient amount of thermal energy to change the secondary fluid 3 to a supercritical state or a gaseous state when absorbing the thermal energy from the primary fluid 1 in the heat exchanger 2. The secondary fluid 3 may thus be in a supercritical state or a gaseous state when entering the turbine 5 to drive the turbine 5 in the manner discussed above. In some cases, the primary fluid 1 may itself be changed to supercritical state or a gaseous state via the thermal energy source. In the system of FIG. 3C, the distance between the geothermal power plant and the geothermal energy source is a predetermined distance measured from the location adjacent to the well 13 to the bottom of the well 13.

Figure 3F:
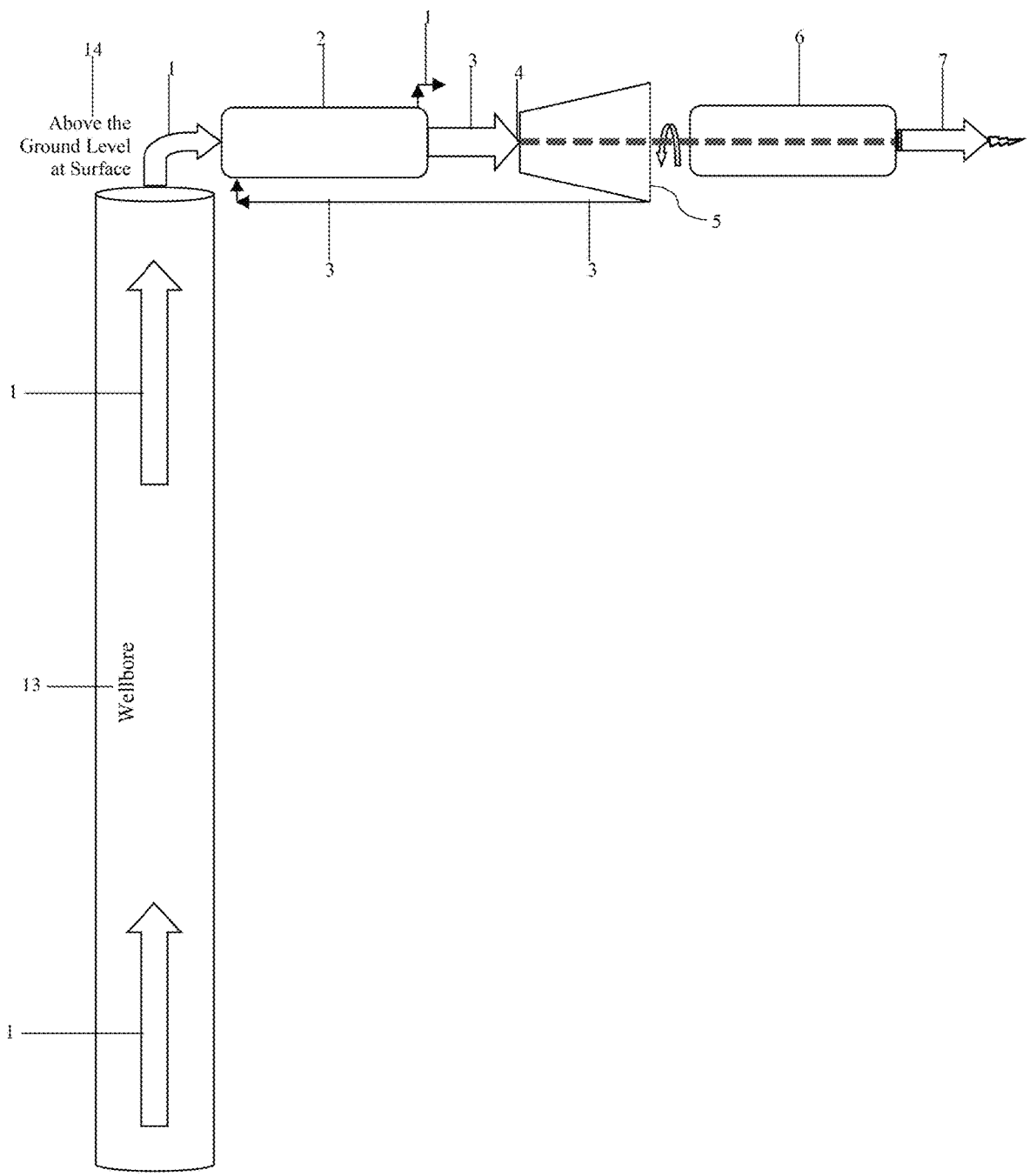
FIG. 3F is a schematic illustration of another geothermal system for generating electricity in which the geothermal power plant is positioned adjacent to a wellhead according to another embodiment.

FIG. 3F illustrates another embodiment of a geothermal system for generating electricity. In this embodiment, the geothermal system includes the geothermal power plant of FIG. 1B which is positioned adjacent to the wellhead of the well 13 as discussed above with respect to FIG. 3E. The geothermal power plant intakes the heated primary fluid 1 into the heat exchanger 2, and may operate in the manner discussed above with respect to FIG. 1B to generate electricity 7. Positioning the geothermal power plant adjacent to the wellhead of the well 13 as shown in FIG. 3F decreases the distance between the geothermal power plant and the geothermal energy source in the well 13 as compared to conventional systems in which the electricity generating components (e.g., heat exchanger, turbine and electricity generator) are disposed at a location far from the well, as discussed above. Thus, the relatively close distance between the geothermal power plant and the geothermal energy source in FIG. 3F may provide the system of FIG. 3F with the same benefits with respect to thermal energy, efficiency and electricity output as discussed above with respect to the system in FIG. 3E.

Figure 3G:
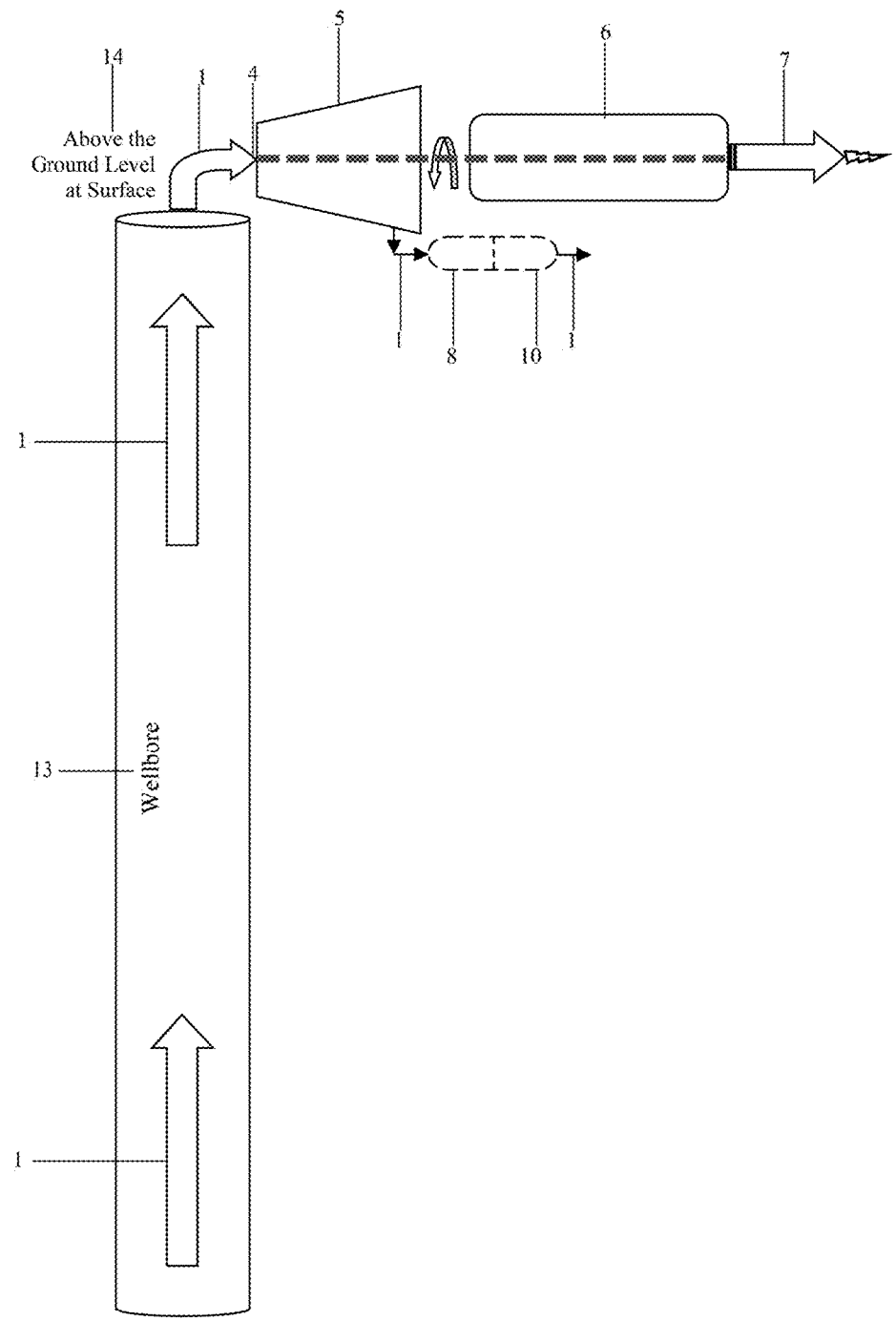
FIG. 3G is a schematic illustration of a further geothermal system for generating electricity in which the geothermal power plant is positioned adjacent to a wellhead according to a further embodiment.

FIG. 3G illustrates a further embodiment of a geothermal system for generating electricity in which the geothermal power plant is located adjacent to the wellhead of the well 13. In this embodiment, the geothermal system includes the "single fluid" geothermal power plant of either of FIG. 1C. That is, the geothermal power plant in FIG. 3G uses the primary fluid 1 to drive the turbine 5 as discussed above with respect to FIG. 1C. The well 13 may extend to a geothermal energy source (not shown), which may be a hot rock formation or reservoir in the underground geologic formation as discussed above. The component parts of the geothermal systems and power plants identified with the same reference numerals in the above embodiments may be the same and operate in the same manner. Positioning the geothermal power plant adjacent to the wellhead as shown in FIG. 3G decreases the distance between the geothermal power plant and the geothermal energy source in the well 13 as compared to conventional systems, as discussed above. Decreasing the distance between the geothermal power plant and the geothermal energy source as in FIG. 3G helps prevent and/or reduce such thermal energy loss of the primary fluid 1 while the primary fluid 1 is conveyed to the turbine 5. This is because the primary fluid 1 does not travel far from the well 13 before entering the turbine that is positioned adjacent to the well 13. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the turbine 5. Maintaining the amount of thermal energy absorbed by the primary fluid 1 from the geothermal energy maximizes the amount of kinetic energy in the primary fluid 1, and hence the potency in which the primary fluid 1 can drive the turbine 5. That is, maximizing the amount of amount of kinetic energy in the primary fluid 1 can enable the primary fluid 1 to drive the turbine 5 with a greater force and/or velocity. As discussed above, driving the turbine 5 with more force and/or velocity turns the turbine shaft faster, which creates more electromagnetic induction in the electricity generator 6 at a faster rate. As a result, the electricity generator 6 generates more electricity 7 at a faster rate. Thus, the relatively close distance between the geothermal power plant and the geothermal energy source in FIG. 3G may provide the system of FIG. 3G with the same benefits with respect to thermal energy, efficiency and electricity output as discussed above with respect to the system in FIG. 3E.

In the system of FIG. 3G, the primary fluid 1 may change to a supercritical state or a gaseous state when absorbing thermal energy from the geothermal energy source. The distance between the geothermal power plant and the geothermal energy source may allow the heated primary fluid 1 to maintain the supercritical state or gaseous state so that the primary fluid 1 may be in the supercritical state or the gaseous state when entering the turbine 5 to drive the turbine 5 in the manner discussed above. In the system of FIG. 3G, the distance between the geothermal power plant and the geothermal energy source is a predetermined distance measured from the location adjacent to the well 13 to the bottom of the well 13.

Figure 3H:
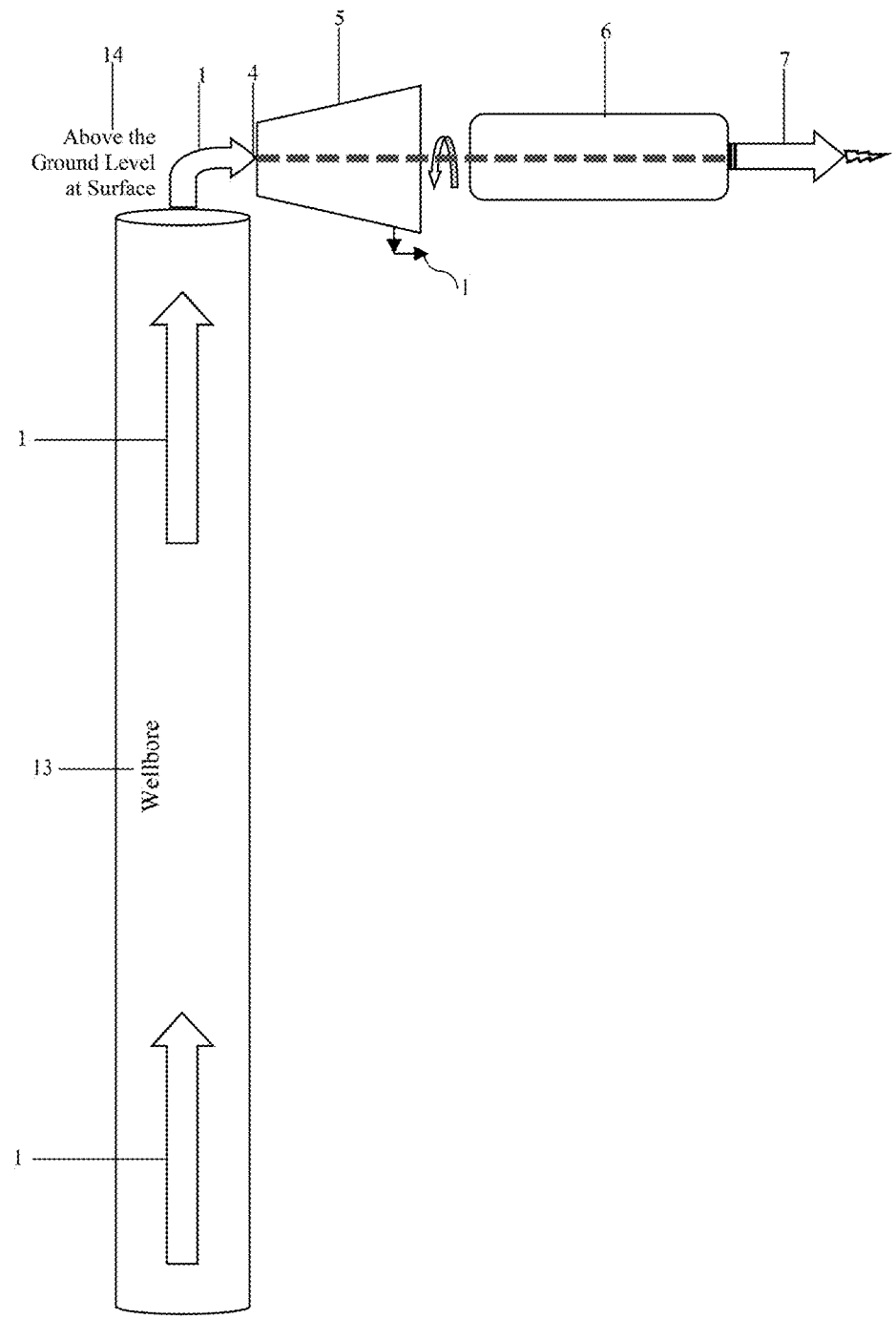
FIG. 3H is a schematic illustration of yet another geothermal system for generating electricity in which the geothermal power plant is positioned adjacent to a wellhead according to yet another embodiment.

FIG. 3H illustrates yet another embodiment of a geothermal system for generating electricity in which the geothermal power plant is positioned adjacent to the wellhead of the well 13. In this embodiment, the geothermal system includes the geothermal power plant of FIG. 1D. The geothermal power plant intakes the heated primary fluid 1 into the turbine 5, and may operate in the manner discussed above with respect to FIG. 1D to generate electricity 7. Positioning the geothermal power plant adjacent to the wellhead of the well 13 as shown in FIG. 3H decreases the distance between the geothermal power plant and the geothermal energy source in the well 13 as compared to conventional systems in which the electricity generating components (e.g., heat exchanger, turbine and electricity generator) are disposed at a location far from the well, as discussed above. Thus, the relatively close distance between the geothermal power plant and the geothermal energy source in FIG. 3H may provide the system of FIG. 3H with the same benefits with respect to thermal energy, efficiency and electricity output as discussed above with respect to the system in FIG. 3E.

Figure 4A:
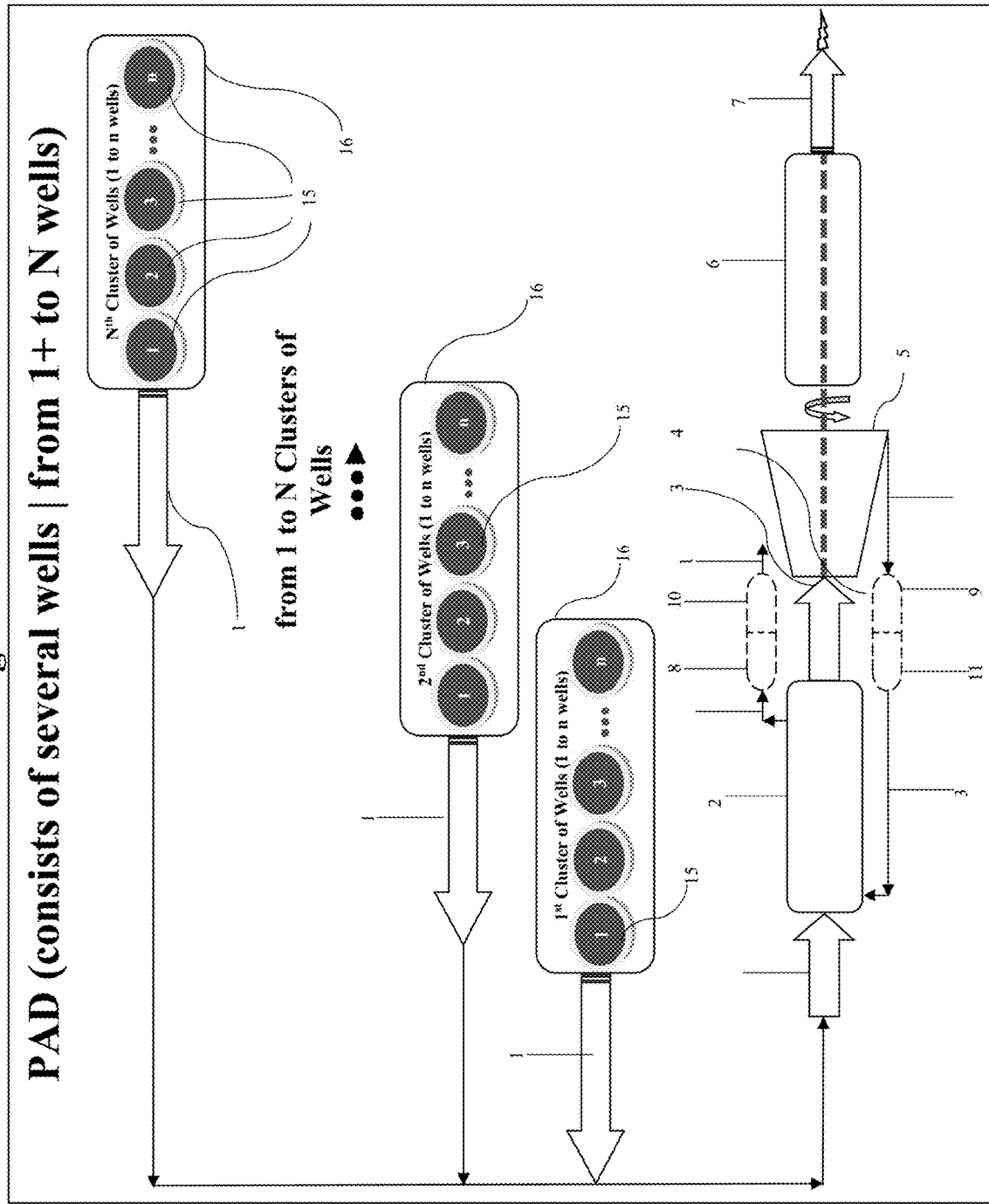
FIG. 4A is a schematic layout of a geothermal system for generating electricity in which the geothermal power plant is positioned on a pad, according to an embodiment.

FIG. 4A illustrates a layout of a geothermal system for generating electricity according to an embodiment. This system includes a pad that may be part of a field of wells that includes pads. The pad may include one or more wells 13 that extend from a surface 14 of the earth into an underground geologic formation, as discussed above. As discussed above, each of the wells 13 may include a geothermal energy source. When a plurality of wells 13 are provided on the pad, the wells 13 may be grouped into different clusters of wells 13 as shown in FIG. 4A. The number of wells 13 and/or pads is not particularly limiting to the present disclosure, and the number of wells 13 and/or pads may be from one to "N" number. In the illustrated embodiment, a geothermal power plant having the configuration according to FIG. 1A is provided on the pad together with three clusters of wells 13. The component parts of the geothermal power plants identified with the same reference numerals in FIGS. 1A and 4A may be the same and operate in the same manner. Each of the wells 13 on the pad may be provided with a primary fluid 1 that absorbs thermal energy from the geothermal energy source to produce a heated primary fluid 1 as discussed above. The heated primary fluids 1 from all of the wells 13 on the pad may be conveyed in or more conduits that feed the heated primary fluids 1 into the heat exchanger 2 of the geothermal power plant. The heat exchanger 2 may then exchange the thermal energy of the heated primary fluid 1 with a secondary fluid 3 so that the secondary fluid 3 absorbs the thermal energy and becomes a heated secondary fluid 3 as discussed above. As discussed above, the heated secondary fluid 3 is used to drive the turbine 5, which drives the electricity generator 6 to generate electricity 7. The electricity 7 produced can be extracted from the electricity generator 6, and may be sent to an electrical grid for commercial distribution and use as discussed above. The heated primary fluid 1 exiting the condenser 8 and/or compressor 10 may be conveyed into one or more of the wells 13 on the pad for recirculation as discussed above.

Locating the geothermal power plant on the same pad as the wells 13 or clusters of wells 13 as shown in FIG. 4A decreases the distance between the geothermal power plant and the geothermal energy source in the well 13 as compared to conventional systems in which the electricity generating components (e.g., heat exchanger, turbine and electricity generator) are disposed at a location far from the well. As discussed above, the thermal energy absorbed by a primary fluid from a geothermal energy source in those systems is lost during transportation of the primary fluid from the well to a heat exchanger at the far away location. Decreasing the distance between the geothermal power plant and the geothermal energy source as in FIG. 4A helps prevent and/or reduce such thermal energy loss of the primary fluid 1 while the primary fluid 1 is conveyed to the heat exchanger 2. This is because the primary fluid 1 does not travel beyond the pad before entering the heat exchanger 2 positioned on the pad. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the heat exchanger 2.

As discussed above, maintaining the amount of thermal energy absorbed by the primary fluid 1 from the geothermal energy source before the primary fluid 1 enters the heat exchanger 2 maximizes the amount of the thermal energy that is exchanged with the secondary fluid 3 in the heat exchanger 2, and thus increases the efficiency of the heat transfer from the primary fluid 1 to the secondary fluid 3. Maximizing the amount of the thermal energy that can be absorbed by the secondary fluid 3 in the heat exchanger increases the temperature and kinetic energy of the heated secondary fluid 3 so that the heated secondary fluid 3 can drive the turbine 5 with a greater force and/or velocity. Driving the turbine 5 with more force and/or velocity turns the turbine shaft faster, which creates more electromagnetic induction in the electricity generator 6 at a faster rate. As a result, the electricity generator 6 generates more electricity 7 at a faster rate. Decreasing the distance between the geothermal power plant and the geothermal energy source as in FIG. 4A therefore increases the efficiency and output of the geothermal power plant.

In the system of FIG. 4A, the distance between the geothermal power plant and the geothermal energy source may allow the heated primary fluid 1 to maintain a sufficient amount of thermal energy to change the secondary fluid 3 to a supercritical state or a gaseous state when absorbing the thermal energy from the primary fluid 1 in the heat exchanger 2. The secondary fluid 3 may thus be in a supercritical state or a gaseous state when entering the turbine 5 to drive the turbine 5 in the manner discussed above. In some cases, the primary fluid 1 may itself be changed to supercritical state or a gaseous state via the thermal energy source. In the system of FIG. 4A, the distance between the geothermal power plant and the geothermal energy source is a predetermined distance measured from the location of the geothermal power plant on the pad to the bottom at least one of the wells 13 on the same pad.

Figure 4B:
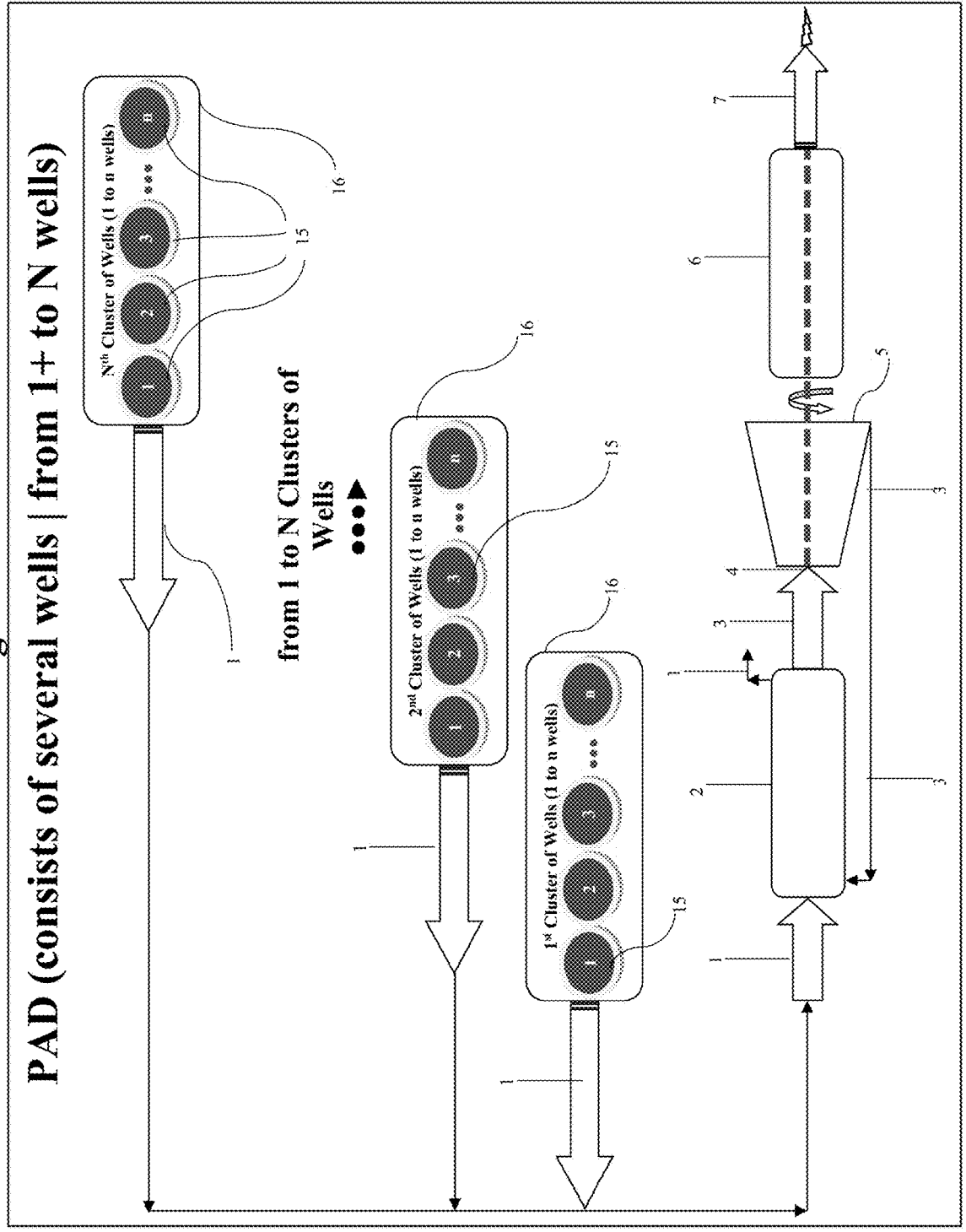
FIG. 4B is a schematic layout of another geothermal system for generating electricity in which the geothermal power plant is positioned on a pad, according to another embodiment.

FIG. 4B illustrates a layout of another geothermal system for generating electricity according to another embodiment. The layout may be the same as the layout in FIG. 4A, but the geothermal power plant in this embodiment is similar to the one in FIG. 1B. That is, the geothermal power plant does not include the condenser 8 and the compressor 10 for the heated primary fluid 1 exiting the heat changer 2, and does not include the condenser 8 and the compressor 10 for the heated secondary fluid 3 exiting the turbine 5. In all other respects, the component parts of the geothermal power plants and systems identified with the same reference numerals in FIGS. 1A, 1B, 4A and 4B may be the same and operate in the same manner. As discussed above, locating the geothermal power plant on the same pad as the wells 13 or clusters of wells 13 as shown in FIG. 4B decreases the distance between the geothermal power plant and the geothermal energy source in the well 13 as compared to conventional systems in which the electricity generating components (e.g., heat exchanger, turbine and electricity generator) are disposed at a location far from the well. The layout of the geothermal system for generating electricity illustrated in FIG. 4B may thus share the same benefits regarding efficiency and output of the geothermal power plant as discussed above with respect to FIG. 4A.

Figure 4C:
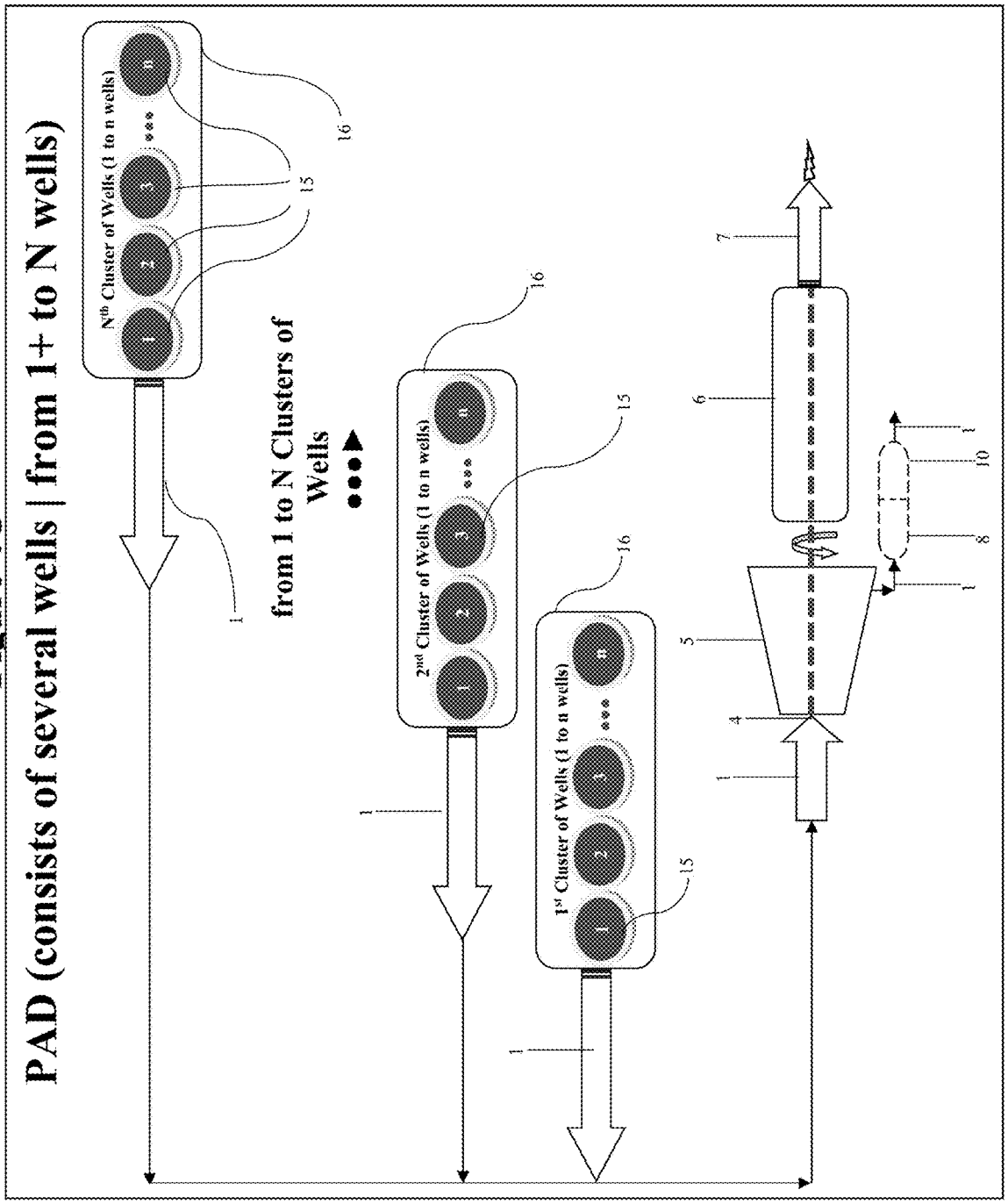
FIG. 4C is a schematic layout of a further geothermal system for generating electricity in which the geothermal power plant is positioned on a pad, according to a further embodiment.

FIG. 4C illustrates a layout of a further geothermal system for generating electricity according to a further embodiment. The layout may be the same as the layout in FIGS. 4A and 4B in which the geothermal power plant is on the same pad as the well(s) 13 or clusters of wells 13, but the geothermal power plant is a "single fluid" geothermal power plant such as illustrated in FIG. 1C. That is, the geothermal power plant in FIG. 4C uses the heated primary fluid 1 to drive the turbine 5 as discussed above with respect to FIG. 1C. The component parts of the geothermal systems and power plants identified with the same reference numerals in the above embodiments may be the same and operate in the same manner. As discussed above, each of the wells 13 on the pad may be provided with a primary fluid 1 that absorbs thermal energy from the geothermal energy source to produce a heated primary fluid 1. The heated primary fluids 1 from all of the wells 13 on the pad may be conveyed in or more conduits that feed the heated primary fluids 1 into the turbine 5 of the geothermal power plant. The heated primary fluid 1 drives the turbine 5, which drives the electricity generator 6 to generate electricity 7, as discussed above. The electricity 7 produced can be extracted from the electricity generator 6, and may be sent to an electrical grid for commercial distribution and use as discussed above. The heated primary fluid 1 exiting the condenser 8 and/or compressor 10 may be conveyed into one or more of the wells 13 on the pad for recirculation as discussed above. As discussed above, locating the geothermal power plant on the same pad as the wells 13 or clusters of wells 13 as shown in FIG. 4C decreases the distance between the geothermal power plant and the geothermal energy source in the well 13 as compared to conventional systems in which the electricity generating components (e.g., the turbine and electricity generator) are disposed at a location far from the well. The layout of the geothermal system for generating electricity illustrated in FIG. 4C may thus share the same benefits regarding efficiency and output of the geothermal power plant as discussed above with respect to FIGS. 4A and 4B.

Figure 4D:
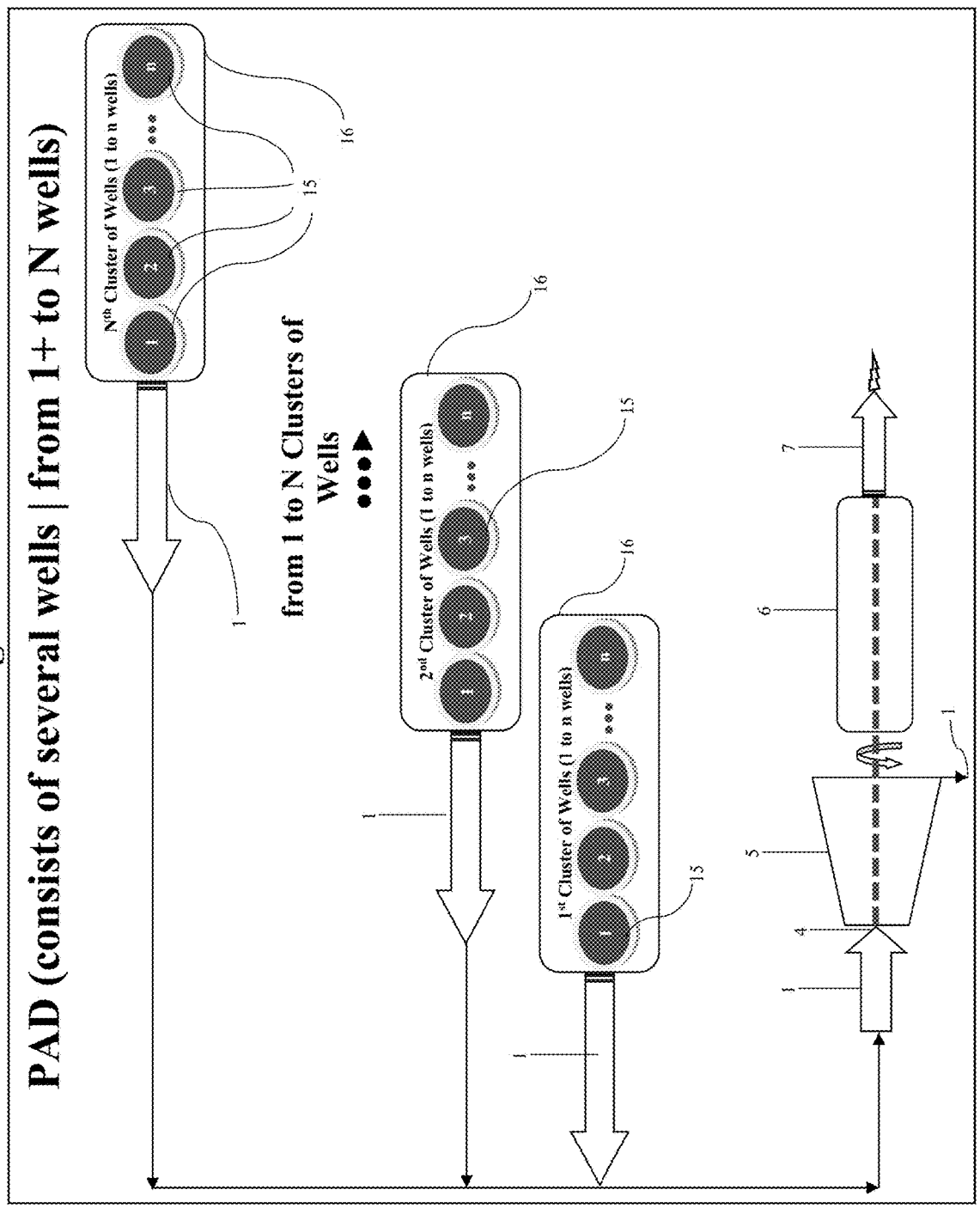
FIG. 4D is a schematic layout of yet another geothermal system for generating electricity in which the geothermal power plant is positioned on a pad, according to yet another embodiment.

FIG. 4D illustrates a layout of yet another geothermal system for generating electricity according to yet another embodiment. The layout may be the same as the layout in FIG. 4C, but the geothermal power plant in this embodiment is similar to the one in FIG. 1D. That is, the geothermal power plant does not include the condenser 8 and the compressor 10 for the heated primary fluid 1 exiting the turbine 5. In all other respects, the component parts of the geothermal power plants and systems identified with the same reference numerals in FIGS. 1C, 1D, 4C and 4D may be the same and operate in the same manner. As discussed above, locating the geothermal power plant on the same pad as the wells 13 or clusters of wells 13 as shown in FIG. 4D decreases the distance between the geothermal power plant and the geothermal energy source in the well 13 as compared to conventional systems in which the electricity generating components (e.g., the turbine and electricity generator) are disposed at a location far from the well. The layout of the geothermal system for generating electricity illustrated in FIG. 4D may thus share the same benefits regarding efficiency and output of the geothermal power plant as discussed above with respect to FIGS. 4A to 4C.

FIG. 5A1 illustrates another layout of a geothermal system for generating electricity according to an embodiment. This system shows a field of wells including a one or more pads (in this case, four pads are shown in the field of FIG. 5A1). As discussed above, each pad may include one or more wells 13 (or clusters of wells 13) that extend from a surface 14 of the earth into an underground geologic formation. As also discussed above, each of the wells 13 may include a geothermal energy source. The number of pads is not particularly limiting to the present disclosure, and the number of pads may be from one to "N" number. In the illustrated embodiment, a geothermal power plant having the configuration according to FIG. 1A is located in the field of wells between the four pads. The component parts of the geothermal power plants and systems identified with the same reference numerals in FIGS. 1A, 4A and 5A1 may be the same and operate in the same manner. Each of the wells 13 on the pads may be provided with a primary fluid 1 that absorbs thermal energy from the geothermal energy source to produce a heated primary fluid 1 as discussed above. The heated primary fluids 1 from all of the wells 13 on the pads may be conveyed in or more conduits that feed the heated primary fluids 1 into the heat exchanger 2 of the geothermal power plant. The heat exchanger 2 may then exchange the thermal energy of the heated primary fluid 1 with a secondary fluid 3 to drive the turbine 5 and thus the electricity generator 6 to generate electricity 7 as discussed above. The electricity 7 produced can be extracted from the electricity generator 6, and may be sent to an electrical grid for commercial distribution and use as discussed above. The heated primary fluid 1 exiting the condenser 8 and/or compressor 10 may be conveyed into one or more of the wells 13 on one or more of the pads for recirculation as discussed above.

Locating the geothermal power plant in the field of wells between the pads as shown in FIG. 5A1 decreases the distance between the geothermal power plant and the geothermal energy sources in the wells 13 as compared to conventional systems in which the electricity generating components (e.g., heat exchanger, turbine and electricity generator) are disposed at a location far from the well. As discussed above, the thermal energy absorbed by a primary fluid from a geothermal energy source in those systems is lost during transportation of the primary fluid from the well to a heat exchanger at the far away location. Decreasing the distance between the geothermal power plant and the geothermal energy source as in FIG. 5A1 helps prevent and/or reduce such thermal energy loss of the primary fluid 1 while the primary fluid 1 is conveyed to the heat exchanger 2. This is because the primary fluid 1 does not travel out of the field before entering the heat exchanger 2 positioned on the pad. Accordingly, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the heat exchanger 2. In some embodiments, the field of wells may include multiple geothermal power plants provided between different groups of pads, as shown in FIG. 5A2. In such an embodiment, the geothermal power plants may be and operate in the same manner as discussed herein.

As discussed above, maintaining the amount of thermal energy absorbed by the primary fluid 1 from the geothermal energy source before the primary fluid 1 enters the heat exchanger 2 maximizes the amount of the thermal energy that is exchanged with the secondary fluid 3 in the heat exchanger 2, and thus increases the efficiency of the heat transfer from the primary fluid 1 to the secondary fluid 3. Maximizing the amount of the thermal energy that can be absorbed by the secondary fluid 3 in the heat exchanger increases the temperature and kinetic energy of the heated secondary fluid 3 so that the heated secondary fluid 3 can drive the turbine 5 with a greater force and/or velocity. Driving the turbine 5 with more force and/or velocity turns the turbine shaft faster, which creates more electromagnetic induction in the electricity generator 6 at a faster rate. As a result, the electricity generator 6 generates more electricity 7 at a faster rate. Decreasing the distance between the geothermal power plant and the geothermal energy source as in FIG. 5A1 therefore increases the efficiency and output of the geothermal power plant.

In the system of FIG. 5A1, the distance between the geothermal power plant and the geothermal energy source may allow the heated primary fluid 1 to maintain a sufficient amount of thermal energy to change the secondary fluid 3 to a supercritical state or a gaseous state when absorbing the thermal energy from the primary fluid 1 in the heat exchanger 2. The secondary fluid 3 may thus be in a supercritical state or a gaseous state when entering the turbine 5 to drive the turbine 5 in the manner discussed above. In some cases, the primary fluid 1 may itself be changed to supercritical state or a gaseous state via the thermal energy source. In the system of FIG. 5A1, the distance between the geothermal power plant and the geothermal energy source is a predetermined distance measured from the location of the geothermal power plant in the field of wells to the bottom at least one of the wells 13 on one of the pads.

FIG. 5B1 illustrates another layout of a geothermal system for generating electricity according to another embodiment. The layout may be the same as the layout in FIG. 5A1, but the geothermal power plant in this embodiment is similar to the one in FIG. 1B. That is, the geothermal power plant does not include the condenser 8 and the compressor 10 for the heated primary fluid 1 exiting the heat changer 2, and does not include the condenser 8 and the compressor 10 for the heated secondary fluid 3 exiting the turbine 5. In all other respects, the component parts of the geothermal power plants and systems identified with the same reference numerals in FIGS. 1A, 1B, 5A1 and 5B 1 may be the same and operate in the same manner. As discussed above, locating the geothermal power plant in a field of wells between pads as shown in FIG. 5B1 decreases the distance between the geothermal power plant and the geothermal energy source in the well 13 as compared to conventional systems in which the electricity generating components (e.g., heat exchanger, turbine and electricity generator) are disposed at a location far from the well. The layout of the geothermal system for generating electricity illustrated in FIG. 5B 1 may thus share the same benefits regarding efficiency and output of the geothermal power plant as discussed above with respect to FIG. 5A1. In some embodiments, the field of wells may include multiple geothermal power plants provided between different groups of pads, as shown in FIG. B2. In such an embodiment, the geothermal power plants may be and operate in the same manner as discussed herein.

FIG. 5C1 illustrates a layout of a further geothermal system for generating electricity according to a further embodiment. The layout may be the same as the layout in FIGS. 5A1 and 5B1 in which the geothermal power plant is in the field of wells between pads, but the geothermal power plant is a "single fluid" geothermal power plant such as illustrated in FIG. 1C. That is, the geothermal power plant in FIG. 5C1 uses the heated primary fluid 1 to drive the turbine 5 as discussed above with respect to FIG. 1C. The component parts of the geothermal systems and power plants identified with the same reference numerals in the above embodiments may be the same and operate in the same manner. As discussed above, each of the wells 13 on the pads may be provided with a primary fluid 1 that absorbs thermal energy from the geothermal energy source to produce a heated primary fluid 1. The heated primary fluids 1 from all of the wells 13 on the pads may be conveyed in or more conduits that feed the heated primary fluids 1 into the turbine 5 of the geothermal power plant, which is used to drive the electricity generator 6 to generate electricity 7, as discussed above. The electricity 7 produced can be extracted from the electricity generator 6, and may be sent to an electrical grid for commercial distribution and use as discussed above. The heated primary fluid 1 exiting the condenser 8 and/or compressor 10 may be conveyed into one or more of the wells 13 on one or more pads for recirculation as discussed above. As discussed above, locating the geothermal power plant in the field of wells between pads as shown in FIG. 5C1 decreases the distance between the geothermal power plant and the geothermal energy source in the wells 13 as compared to conventional systems in which the electricity generating components (e.g., the turbine and electricity generator) are disposed at a location far from the well. The layout of the geothermal system for generating electricity illustrated in FIG. 5C1 may thus share the same benefits regarding efficiency and output of the geothermal power plant as discussed above with respect to FIGS. 5A1 and 5B1. In some embodiments, the field of wells may include multiple geothermal power plants provided between different groups of pads, as shown in FIG. 5C2. In such an embodiment, the geothermal power plants may be and operate in the same manner as discussed herein.

FIG. 5D1 illustrates a layout of yet another geothermal system for generating electricity according to yet another embodiment. The layout may be the same as the layout in FIG. 5C1, but the geothermal power plant in this embodiment is similar to the one in FIG. 1D. That is, the geothermal power plant does not include the condenser 8 and the compressor 10 for the heated primary fluid 1 exiting the turbine 5. In all other respects, the component parts of the geothermal power plants and systems identified with the same reference numerals in FIGS. 1C, ID, 5C1 and 5D1 may be the same and operate in the same manner. As discussed above, locating the geothermal power plant in the field of wells between pads as shown in FIG. 5D1 decreases the distance between the geothermal power plant and the geothermal energy source in the wells 13 as compared to conventional systems in which the electricity generating components (e.g., the turbine and electricity generator) are disposed at a location far from the well. The layout of the geothermal system for generating electricity illustrated in FIG. 5D1 may thus share the same benefits regarding efficiency and output of the geothermal power plant as discussed above with respect to FIGS. 5A1, 5B1 and 5C1. In some embodiments, the field of wells may include multiple geothermal power plants provided between different groups of pads, as shown in FIG. 5D2. In such an embodiment, the geothermal power plants may be and operate in the same manner as discussed herein.

The foregoing geothermal systems for generating electricity may be utilized in processes of generating electricity. These processes may include heating a primary fluid 1 by absorbing thermal energy from a geothermal energy source in a well 13 to produce a heated primary fluid 1 as discussed herein. The heated primary fluid 1 may be conveyed to a thermal power plant that comprises a turbine 5 and an electricity generator 6 as discussed herein. The process may include driving the turbine 5 by one of: the heated primary fluid 1; and a secondary fluid 3 that absorbs thermal energy from the heated primary fluid 1 via a heat exchanger 2 as discussed herein. The electricity generator 6 may be driven via the turbine 5 to generate electricity 7 as discussed herein. The thermal power plant may be positioned at one of: inside the well 13; partially inside the well 13; at a wellhead above the well 13; adjacent to the well 13; on a pad including one or more wells 13; and between multiple pads including one or more wells 13 in a same field of pads, as discussed herein.

The processes may further include extracting heat from one of the heated primary fluid 1 and the secondary fluid 3 that exits the turbine 5 in a condenser 8, 9 to reduce a temperature of the one of the heated primary fluid 1 and the secondary fluid 3 as discussed herein. The processes may further include increasing a pressure of the one of the heated primary fluid 1 and the secondary fluid 3 via one of: (i) the compressor 10, 11 when the one of the heated primary fluid 1 and the secondary fluid 3 is in a gaseous phase; and (ii) a pump when the one of the heated primary fluid 1 and the secondary fluid 3 is in a liquid phase as discussed herein. In the processes, one of the heated primary fluid 1 and the secondary fluid 3 may change to a supercritical state or a gaseous state when absorbing thermal energy, and the thermal power plant may be positioned at a predetermined distance from the geothermal energy source to maintain the supercritical state or the gaseous state so that one of the heated primary fluid 1 and the secondary fluid 3 enters the turbine 5 in the supercritical state or the gaseous state.

It is within the scope of the present disclosure that the processes of generating electricity may implement any combinations of the components of the systems as discussed herein, and include operation of the systems discussed herein and any combinations of the components of the systems as discussed herein.

The present disclosure discusses processes and systems that decrease the distance between the geothermal power plant and the geothermal energy source in well 13 as compared to conventional systems. In the processes and systems discussed herein, little if any of the thermal energy absorbed by the primary fluid 1 from the geothermal energy source is conducted and/or radiated from the primary fluid 1 (e.g., to a transportation system for conveying the primary fluid away from the well) before the primary fluid 1 enters the geothermal power plant. Maintaining the amount of thermal energy absorbed by the primary fluid 1 from the geothermal energy source before the primary fluid 1 enters the geothermal power plant maximizes the amount of the thermal energy that enters the geothermal power plant, and thus increases the efficiency of the heat transfer from the primary fluid 1 in the geothermal power plant. Maximizing the amount of the thermal energy that can be absorbed in the geothermal power plant increases the kinetic energy that is used to drive the turbine 5, so that the turbine is driven with a greater force and/or velocity. Driving the turbine 5 with more force and/or velocity turns the turbine shaft faster, which creates more electromagnetic induction in the electricity generator 6 at a faster rate. As a result, the electricity generator 6 generates more electricity 7 at a faster rate. Decreasing the distance between the geothermal power plant and the geothermal energy source as discussed herein therefore increases the efficiency and output of the geothermal power plant.

It should be understood that the foregoing description provides embodiments of the present invention which can be varied and combined without departing from the spirit of this disclosure. Although several embodiments have been illustrated in the accompanying drawings and describe in the foregoing specification, it will be understood by those of skill in the art that additional embodiments, modifications and alterations may be constructed from the principles disclosed herein. Those skilled in the art should, in light of the present disclosure, appreciate that many changes can be made in the specific embodiments which are disclosed and still obtain a like or similar result without departing from the concept, spirit and scope of the present disclosure.

What is claimed is:

1. A process of generating electricity from a geothermal energy source, comprising:
    heating a primary fluid by absorbing thermal energy from the geothermal energy source in a well to produce a heated primary fluid;
    conveying the heated primary fluid to a thermal power plant that comprises a turbine and an electricity generator, wherein the turbine comprises a device or equipment that transfers kinetic energy to mechanical energy to perform work;
    driving the turbine by one of: the heated primary fluid; and a secondary fluid that absorbs thermal energy from the heated primary fluid via a heat exchanger; and
    driving the electricity generator via the turbine to generate electricity, wherein:
        the turbine and the electricity generator are positioned at one of: inside the well; partially inside the well; and at a wellhead above the well; and
        the turbine and the electricity generator are maintained in position via an attachment to the wellhead.

2. The process according to claim 1, further comprising extracting heat from one of the heated primary fluid and the secondary fluid that exits the turbine in a condenser to reduce a temperature of the one of the heated primary fluid and the secondary fluid.

3. The process according to claim 1, further comprising increasing a pressure of the one of the heated primary fluid and the secondary fluid via one of: (i) a compressor when the one of the heated primary fluid and the secondary fluid is in a gaseous phase; and (ii) a pump when the one of the heated primary fluid and the secondary fluid is in a liquid phase.

4. The process according to claim 1, wherein the one of the heated primary fluid and the secondary fluid changes to a supercritical state or a gaseous state when absorbing thermal energy, and wherein the turbine and the electricity generator are positioned at a predetermined distance from the geothermal energy source to maintain the supercritical state or the gaseous state so that the one of the heated primary fluid and the secondary fluid enters the turbine in the supercritical state or the gaseous state.

5. A geothermal system for generating electricity, comprising:
    a well that comprises a geothermal energy source;
    a primary fluid that absorbs thermal energy from the geothermal energy source to produce a heated primary fluid; and
    a thermal power plant comprising a turbine and an electricity generator, wherein the turbine comprises a device or equipment that transfers kinetic energy to mechanical energy to perform work, and wherein:
        the turbine is driven by one of: the heated primary fluid; and a secondary fluid that absorbs thermal energy from the heated primary fluid via a heat exchanger;
        the electricity generator is driven by the turbine to generate electricity;
        the turbine and the electricity generator are positioned at one of: inside the well; partially inside the well; and at a wellhead above the well; and
        the turbine and the electricity generator are maintained in position via an attachment to the wellhead.

6. The geothermal system according to claim 5, further comprising a condenser that extracts heat from one of the heated primary fluid and the secondary fluid that exits the turbine to reduce a temperature of the one of the heated primary working fluid and the secondary fluid.

7. The geothermal system according to claim 5, further comprising one of:
    (i) a compressor to increase a pressure of the one of the heated primary fluid and the secondary fluid when the one of the heated primary fluid and the secondary fluid is in a gaseous phase; and (ii) a pump to increase a pressure of the one of the heated primary fluid and the secondary fluid when the one of the heated primary fluid and the secondary fluid is in a liquid phase.

8. The geothermal system according to claim 5, wherein the one of the heated primary fluid and the secondary fluid changes to a supercritical state or a gaseous state when absorbing thermal energy, and wherein the turbine and the electricity generator are positioned at a predetermined distance from the geothermal energy source to maintain the supercritical state or the gaseous state so that the one of the heated primary fluid and the secondary fluid enters the turbine in the supercritical state or the gaseous state.

9. A geothermal system for generating electricity, comprising:
a pad;
a plurality of producing wells on the pad, wherein each of the producing wells comprises a geothermal energy source, and wherein each of the producing wells includes a primary fluid that absorbs thermal energy from the geothermal energy source to produce a heated primary fluid; and
a plurality of thermal power plants each comprising a turbine and an electricity generator, wherein the turbine of each of the thermal power plants comprises a device or equipment that transfers kinetic energy to mechanical energy to perform work, wherein:
each of the thermal power plants receives the heated primary fluid from a corresponding one of the producing wells on the pad or the multiple pads;
the turbine and the electricity generator of each of the thermal power plants are positioned:
inside of a corresponding one of the producing wells;
partially inside of a corresponding one of the producing wells; and
at a wellhead above a corresponding one of the producing wells; and
the turbine and the electricity generator of each of the thermal power plants are maintained in position via an attachment to the wellhead.

10. The geothermal system according to claim 9, wherein, for each of the thermal power plants:
the turbine is driven by one of: the heated primary fluid; and a secondary fluid that absorbs thermal energy from the heated primary fluid via a heat exchanger; and
the electricity generator is driven by the turbine to generate electricity.

11. The geothermal system according to claim 10, wherein each of the thermal power plants further comprises a condenser that extracts heat from one of the heated primary fluid and the secondary fluid that exits the turbine to reduce a temperature of the one of the heated primary working fluid and the secondary fluid.

12. The geothermal system according to claim 10, wherein each of the thermal power plants further comprises one of:
(i) a compressor to increase a pressure of the one of the heated primary fluid and the secondary fluid when the one of the heated primary fluid and the secondary fluid is in a gaseous phase; and
(ii) a pump to increase a pressure of the one of the heated primary fluid and the secondary fluid when the one of the heated primary fluid and the secondary fluid is in a liquid phase.

13. The geothermal system according to claim 9, wherein the one of the heated primary fluid and the secondary fluid changes to a supercritical state or a gaseous state when absorbing thermal energy, and wherein the turbine and the electricity generator of each of the thermal power plants is positioned at a predetermined distance from the geothermal energy source to maintain the supercritical state or the gaseous state so that the one of the heated primary fluid and the secondary fluid enters the turbine in the supercritical state or the gaseous state.

14. The process according to claim 1, wherein the turbine and the electricity generator are positioned inside the well.

15. The process according to claim 1, wherein the turbine and the electricity generator are positioned partially inside the well.

16. The process according to claim 1, wherein the turbine and the electricity generator are positioned inside the wellhead above the well.

17. The geothermal system according to claim 5, wherein the turbine and the electricity generator are positioned inside the well.

18. The geothermal system according to claim 5, wherein the turbine and the electricity generator are positioned partially inside the well.

19. The geothermal system according to claim 5, wherein the turbine and the electricity generator are positioned inside the wellhead above the well.

20. The geothermal system according to claim 9, wherein the turbine and the electricity generator of each of the thermal power plants are positioned inside the wellhead above a corresponding one of the producing wells.

\* \* \* \* \*